(12) United States Patent
Takahashi et al.

(10) Patent No.: US 10,630,187 B2
(45) Date of Patent: Apr. 21, 2020

(54) SWITCHING POWER SUPPLY DEVICE AND SEMICONDUCTOR DEVICE

(71) Applicant: PANASONIC INTELLECTUAL PROPERTY MANAGEMENT CO., LTD., Osaka (JP)

(72) Inventors: Kensuke Takahashi, Shiga (JP); Takashi Saji, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/282,723

(22) Filed: Feb. 22, 2019

(65) Prior Publication Data

US 2019/0190391 A1     Jun. 20, 2019

Related U.S. Application Data

(63) Continuation of application No. PCT/JP2017/030032, filed on Aug. 23, 2017.

(30) Foreign Application Priority Data

Aug. 30, 2016   (JP) ................................. 2016-168618

(51) Int. Cl.
*H02M 3/335*       (2006.01)
*H02M 1/08*        (2006.01)
(Continued)

(52) U.S. Cl.
CPC .......... *H02M 3/33523* (2013.01); *H02M 1/08* (2013.01); *H02M 1/44* (2013.01);
(Continued)

(58) Field of Classification Search
CPC ......... H02M 3/33507; H02M 3/33523; H02M 3/33569; H02M 3/33576; H02M 1/08;
(Continued)

(56) References Cited

U.S. PATENT DOCUMENTS 9,509,225 B2 * 11/2016 Stephens ............. H02M 3/3376
2005/0200343 A1    9/2005 Ueda
(Continued)

FOREIGN PATENT DOCUMENTS

JP       2005-080336 A    3/2005
JP       2005-261011 A    9/2005
(Continued)

OTHER PUBLICATIONS

Shinji Matsumoto, et al., "PWM Power Supply Control IC "FA8B00 Series" Capable of Handling Peak Loads", Fuji Electric Journal, vol. 88, No. 4; Dec. 2015, pp. 287-291; with English translation.
(Continued)

*Primary Examiner* — Yemane Mehari
(74) *Attorney, Agent, or Firm* — McDermott Will & Emery LLP

(57) ABSTRACT

A switching power supply device has both a turn-on timing modulation function and a turn-off timing modulation function, performs the turn-off timing modulation in a PFM control region and the turn-on timing modulation in a PWM control region, and further continues at least one of the modulations even after the PFM control and the PWM control are switched from one to the other, to achieve a stable operation of the switching power supply device at the control switching boundary without significantly decreasing the modulation effect of frequency jitter control.

11 Claims, 22 Drawing Sheets

(51) Int. Cl.
*H02M 1/44* (2007.01)
*H02M 1/00* (2006.01)
*H02M 1/36* (2007.01)

(52) U.S. Cl.
CPC .......... *H02M 3/33507* (2013.01); *H02M 1/36* (2013.01); *H02M 2001/0006* (2013.01); *H02M 2001/0009* (2013.01); *H02M 2001/0032* (2013.01)

(58) Field of Classification Search
CPC .... H02M 1/36; H02M 1/4208; H02M 1/4225; H02M 1/44; H02M 2001/0006; H02M 2001/0009; H02M 2001/0032; H02M 7/48; H02M 7/122; Y02B 70/128; Y02B 70/1433; Y02B 70/1441; Y02B 70/1475
USPC ............. 363/21.01–21.18, 56.1, 89; 323/282
See application file for complete search history.

(56) References Cited

U.S. PATENT DOCUMENTS

| | | | |
|---|---|---|---|
| 2008/0309303 A1 | 12/2008 | Morota et al. | |
| 2009/0097284 A1 | 4/2009 | Takei et al. | |
| 2009/0103338 A1 | 4/2009 | Nakamura | |
| 2009/0147547 A1* | 6/2009 | Yamashita | H02M 3/33507 363/21.16 |
| 2010/0309690 A1* | 12/2010 | Kawabe | H02M 3/33507 363/21.01 |
| 2010/0321963 A1* | 12/2010 | Yamashita | H02M 3/33507 363/21.17 |
| 2013/0051088 A1* | 2/2013 | Yamashita | H02M 1/36 363/21.13 |
| 2014/0078784 A1 | 3/2014 | Nishijima | |
| 2014/0301118 A1 | 10/2014 | Yabuzaki | |
| 2014/0328090 A1* | 11/2014 | Takahashi | H02M 3/33507 363/21.17 |

FOREIGN PATENT DOCUMENTS

| | | |
|---|---|---|
| JP | 2008-312359 A | 12/2008 |
| JP | 2009-100498 A | 5/2009 |
| JP | 2009-100591 A | 5/2009 |
| JP | 2012-191735 A | 10/2012 |
| JP | 2014-064379 A | 4/2014 |
| JP | 2014-204544 A | 10/2014 |
| JP | 5899504 B2 | 4/2016 |
| WO | 2011/158282 A1 | 12/2011 |
| WO | 2013/080403 A1 | 6/2013 |

OTHER PUBLICATIONS

International Search Report and Written Opinion, dated Sep. 19, 2017 in International Application No. PCT/JP2017/030032; with partial English translation.

\* cited by examiner

FEEDBACK SIGNAL CONTROL CIRCUIT

MODULATION SIGNAL GENERATION CIRCUIT

SWITCHING POWER SUPPLY DEVICE AND SEMICONDUCTOR DEVICE

CROSS REFERENCE TO RELATED APPLICATIONS

This application is a U.S. continuation application of PCT International Patent Application Number PCT/JP2017/030032 filed on Aug. 23, 2017, claiming the benefit of priority of Japanese Patent Application Number 2016-168618 filed on Aug. 30, 2016, the entire contents of which are hereby incorporated by reference.

BACKGROUND

1. Technical Field

The present disclosure relates to a switching power supply device having a frequency jitter (frequency modulation) control function that provides a high noise reduction effect of reducing noise produced by a switching power supply including a frequency changing control and further relates to a semiconductor device that forms the switching power supply device.

2. Description of the Related Art

A wide variety of home appliances, office instruments, and other electronic apparatuses each use a switching power supply device to improve the electric power conversion efficiency, reduce the size of the apparatus, and achieve other advantages. Such a switching power supply device uses a switching operation performed, for example, by a semiconductor switching element to control, for example, output voltage and supplies electric power to a load.

An example of frequency fixing control in which the control is performed at a constant switching frequency irrespective of the magnitude of an output load includes PWM (pulse width modulation) control.

In such a switching power supply device, when the switching frequency is fixed, the components of the spectrum of high-frequency current flowing through the switching element are biased toward the switching frequency and the harmonics components of the switching frequency, and harmonics conductive noise therefore undesirably is likely to occur. The problem of conductive noise can be addressed by an anti-noise part, such as a filter circuit, but such an approach prevents reduction in the size and cost of the power supply, and it is therefore required to address the problem by using skillful control. It is typical to use an approach of imparting a periodic fluctuation having a constant width to the switching frequency at which the switching element is turned on and off. When the harmonics noise resulting from the switching is dispersed in terms of frequency, the average of conducted EMI (voltage disturbance) is reduced. The control described above is called frequency jitter control because fluctuation is imparted to the frequency.

Further, to improve the efficiency in the standby state of the switching power supply and the efficiency in the case of a light load, an example of a frequency changing control in which the switching frequency is changed in accordance with the magnitude of an output load includes PFM (pulse frequency modulation) control.

Also in the PFM control, in a case where the input voltage or the output load is constant, a fixed switching frequency causes the problem of harmonics noise, and the frequency jitter control is therefore required.

In the switching power supply device disclosed in Japanese Unexamined Patent Application Publication No. 2014-204544, in a case where a change in the switching frequency resulting from feedback signal control cancels a change in the switching frequency resulting from a modulation signal in the PFM control, setting the amplitude of the modulation signal at a large value can prevent a decrease in the frequency jitter modulation effect, whereby the noise can be effectively reduced.

The switching power supply device disclosed in Japanese Patent No. 5,899,504 is configured so that in the PFM control, a feedback signal controls the timing when a switching element is turned on, a modulation signal controls the timing when the switching element is turned off, and the feedback signal and the modulation signal are so controlled as to be input separately from each other. As a result, the feedback signal and the modulation signal do not cancel each other, whereby a decrease in the frequency jitter modulation effect can be avoided, and the noise can therefore be effectively reduced.

SUMMARY

In the switching power supply device of the related art disclosed in Japanese Unexamined Patent Application Publication No. 2014-204544, enhancing the turn-on timing modulation in the PFM control region can prevent a decrease in the frequency jitter modulation effect. In complex control in which the PFM control and the PWM control are switched from one to the other, however, the frequency jitter modulation amplitude, that is, the turn-on timing modulation amplitude is switched at the boundary between the PFM control and the PWM control, the control is likely to be unstable in a case where the load acts at the boundary between the PFM control and the PWM control. To stabilize the operation at the boundary, Japanese Unexamined Patent Application Publication No. 2014-204544 discloses that a hysteresis is imparted to the modulation amplitude switching control. In part of the PFM control after the PWM control is switched to the PFM control, however, presence of a region where the modulation effect is small causes deterioration of the conducted EMI in the power supply.

In the switching power supply device of the related art disclosed in Japanese Patent No. 5,899,504, the turn-on timing modulation is performed in the PWM control, and the turn-off timing modulation is performed in the PFM control, but the stability of the control switching is not clearly stated. Further, in a case where the two methods, the turn-on timing modulation and the turn-off timing modulation, are simultaneously switched from one to the other at the switching boundary, the control is likely to be unstable.

An object of the present disclosure is to solve the problems described above and provide a switching power supply device having a frequency jitter control function that provides a high noise reduction effect of reducing noise produced by a switching power supply in complex control including frequency changing control and frequency fixing control.

In order to solve the above-described problem, a switching power supply device according to the present disclosure includes: an energy conversion circuit to which an input voltage is input, the input voltage being a direct current input voltage; an output rectifying and smoothening circuit that rectifies and smoothens a voltage output from the energy conversion circuit to output an output voltage to a load; a switching element that is connected to the energy conversion circuit and switches the input voltage; a switching control circuit that controls a switching operation of the switching element; and an output state detection circuit that generates an output state signal indicating a state of the load, the state determining electric power output from the energy conversion circuit. The switching control circuit: switches two control modes from one to another in accordance with the output state signal, the two control modes including: (i) a frequency changing control mode in which a turn-on timing at which the switching element is turned on is controlled in accordance with the output state signal to change a first switching frequency that is a switching frequency of the switching element; and (ii) a frequency fixing control mode in which a turn-off timing at which the switching element is turned off is controlled in accordance with the output state signal and the switching frequency of the switching element is set to a second switching frequency that is constant with respect to the output state signal; performs, in the frequency changing control mode, first modulation control in which the turn-off timing at which the switching element is turned off is modulated by a first modulation signal so that the first switching frequency is modulated; performs, in the frequency fixing control mode, second modulation control in which the second switching frequency is modulated by a second modulation signal; and performs at least one of the following: when switching the frequency changing control mode to the frequency fixing control mode, continuing the first modulation control even after the frequency changing control mode is switched to the frequency fixing control mode, the first modulation control being performed in the frequency changing mode; and when switching the frequency fixing control mode to the frequency changing control mode, continuing the second modulation control even after the frequency fixing control mode is switched to the frequency changing control mode, the second modulation control being performed in the frequency fixing control mode.

The switching power supply device according to the one aspect of the present disclosure allows effective frequency dispersion with no significant decrease in the modulation effect both in the frequency changing control and the frequency fixing control and further allows a stable operation of the switching power supply device at the switching boundary between the frequency changing control and frequency fixing control.

The switching control circuit may perform at least one of the following: when switching the frequency changing control mode to the frequency fixing control mode, gradually decreasing a modulation amplitude in the first modulation control until the frequency changing control mode is switched to the frequency fixing control mode; and when switching the frequency fixing control mode to the frequency changing control mode, gradually decreasing a modulation amplitude in the second modulation control until the frequency fixing control mode is switched to the frequency changing control mode.

The switching power supply device according to the one aspect of the present disclosure, in which the modulation amplitude is moderately decreased when the frequency changing control and the frequency fixing control are switched from one to the other, allows a stable operation of the switching power supply device at the switching boundary.

The switching control circuit may: compare the turn-on timing at which the switching element is turned on and which has been modulated in accordance with the second modulation signal with a turn-on timing set in the frequency changing control mode; and turn on the switching element at a later turn-on timing of the turn-on timings.

The switching power supply device according to the one aspect of the present disclosure, in which the second modulation amplitude can be moderately decreased by using a simple circuit, allows a stable operation of the switching power supply device at the switching boundary.

The switching control circuit may: compare the turn-off timing at which the switching element is turned off and which has been modulated in accordance with the first modulation signal with a turn-off timing set in the frequency fixing control mode; and turn off the switching element at a later turn-off timing of the turn-off timings.

The switching power supply device according to the one aspect of the present disclosure, in which the modulation amplitude is moderately decreased when the frequency changing control and the frequency fixing control are switched from one to the other, allows a stable operation of the switching power supply device at the switching boundary.

The switching control circuit may perform at least one of the following: when switching the frequency changing control mode to the frequency fixing control mode, gradually decreasing a modulation amplitude in the first modulation control after the frequency changing control mode is switched to the frequency fixing control mode; and when switching the frequency fixing control mode to the frequency changing control mode, gradually decreasing a modulation amplitude in the second modulation control after the frequency fixing control mode is switched to the frequency changing control mode.

The switching power supply device according to the one aspect of the present disclosure, in which the modulation amplitude is moderately decreased when the frequency changing control and the frequency fixing control are switched from one to the other, allows a stable operation of the switching power supply device at the switching boundary.

The switching control circuit may modulate the first switching frequency by the second modulation signal across an entire segment in which the switching power supply device operates in the frequency changing control mode.

The switching power supply device according to the one aspect of the present disclosure allows an increase in the modulation effect in the frequency changing control region and further allows effective frequency dispersion. The switching power supply device according to the one aspect of the present disclosure still further allows a decrease in the first modulation amplitude to increase the stability of the control.

In the control which is performed in the frequency changing control mode and in which the first switching frequency is modulated by the second modulation signal, modulation amplitude may be set to a larger value for a higher switching frequency of the switching element.

The switching power supply device according to the one aspect of the present disclosure allows an increase in the modulation effect in the frequency changing control region and further allows effective frequency dispersion. The switching power supply device according to the one aspect of the present disclosure still further allows a decrease in the first modulation amplitude to increase the stability of the control.

The switching control circuit may control the turn-off timing at which the switching element is turned off in the frequency changing control mode to be constant irrespective of the output state signal.

The switching power supply device according to the one aspect of the present disclosure allows an increase in the control stability against variation in the output load in the frequency changing control region.

The switching control circuit may change, in accordance with the output state signal, the turn-off timing at which the switching element is turned off in the frequency changing control mode.

The switching power supply device according to the one aspect of the present disclosure allows an increase in the response speed of the control against variation in the output load in the frequency changing control region.

The switching control circuit may delay the turn-off timing at which the switching element is turned off in the frequency changing control mode as the first switching frequency becomes higher.

The switching power supply device according to the one aspect of the present disclosure allows an increase in the response speed of the control against variation in the output load in the frequency changing control region.

The semiconductor device may include: a semiconductor substrate; and the switching control circuit in the above-described switching power supply device disposed as an integrated circuit on the semiconductor substrate.

The switching power supply device according to the one aspect of the present disclosure allows a significant reduction in the number of filter parts in the switching power supply device, whereby the size and weight of the switching power supply device and the cost of the switching power supply device can be readily reduced.

According to the one aspect of the present disclosure described above, the complex control including the turn-on timing modulation and the turn-off timing modulation allows effective frequency dispersion both in the frequency changing control and the frequency fixing control, and continuously performing the modulations even after the frequency changing control and the frequency fixing control are switched from one to the other allows a switching power supply device having a frequency jitter control function capable of a stable operation at the control switching boundary to be achieved.

BRIEF DESCRIPTION OF DRAWINGS

These and other objects, advantages, and features of the disclosure will become apparent from the following description thereof taken in conjunction with the accompanying drawings that illustrate a specific embodiment of the present disclosure.

DETAILED DESCRIPTION OF THE EMBODIMENTS

Findings on which Embodiments of Present Disclosure is Based

The present inventors have found that the following problems occur with the switching power supply devices described in the paragraph "Description of the Related Art."

Figure 23:
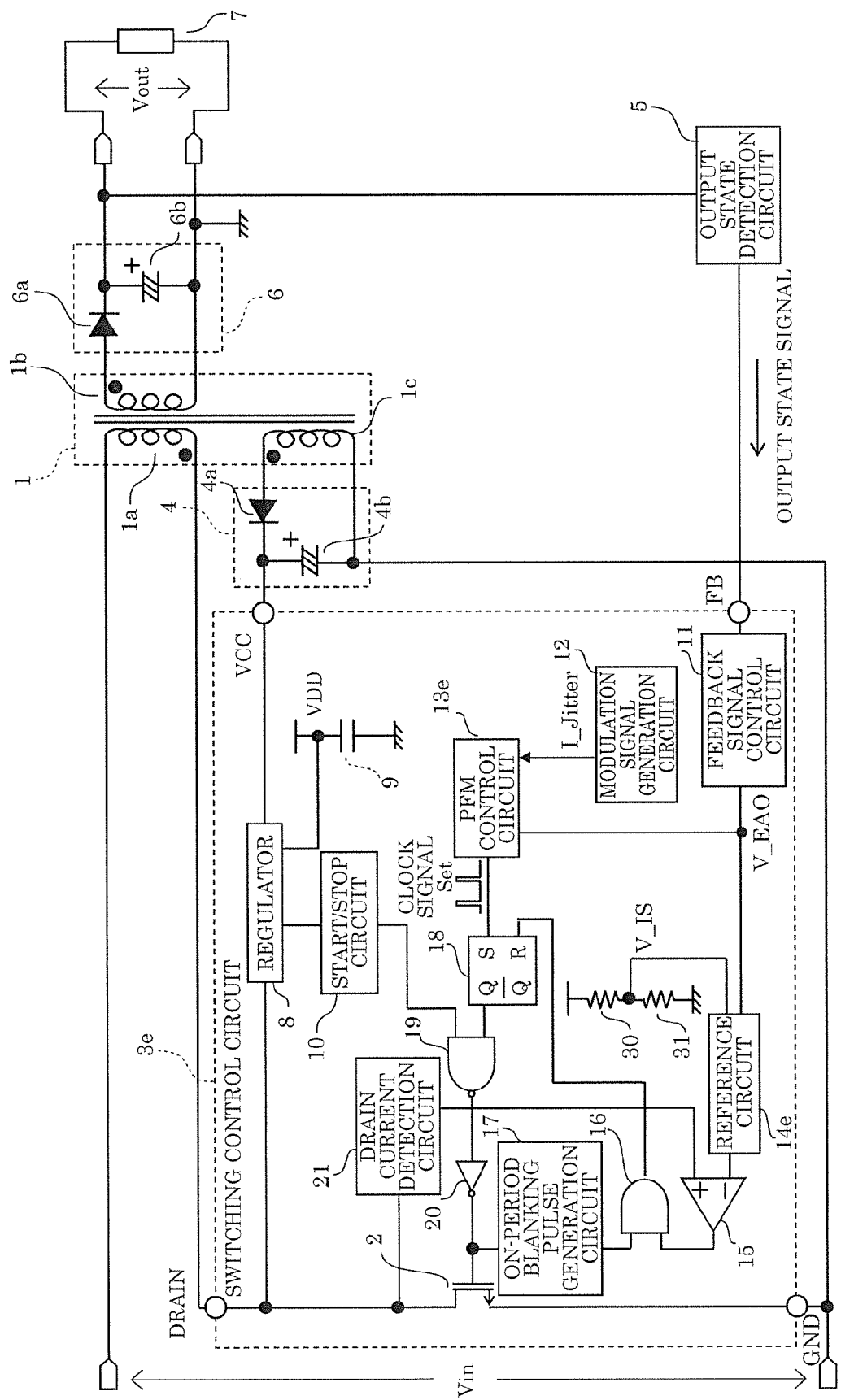
FIG. 23 is a circuit diagram showing an example of the configuration of a switching power supply device according to Comparative Reference Example.

FIG. 23 shows an example of the configuration of a switching power supply device including a semiconductor device including a PFM control circuit according to Comparative Reference Example.

In the switching power supply device shown in FIG. 23, feedback signal V_EAO from feedback signal control circuit 11 and modulation signal I_Jitter from modulation signal generation circuit 12 are both input to PFM control circuit 13e, which determines the on timing at which switching element 2 is turned on.

Since feedback signal V_EAO, which changes in accordance with load 7, and modulation signal I_Jitter, which imparts a periodic fluctuation signal having a constant amplitude irrespective of the state of load 7, are both input to PFM control circuit 13e, which determines the on timing at which switching element 2 is turned on. Therefore, in a case where load 7 changes due, for example, to ripples of input/output to and from the switching power supply, the feedback signal and the modulation signal contribute in such a way that the signals cancel each other and the modulation effect is therefore eliminated in some cases so that no modulation effect can be achieved or modulation according to a setting inferior to the intended setting worsens conducted EMI in the power supply.

In a case where load 7 is constant, a change in the switching frequency resulting from the modulation signal described above cancels a change in the frequency resulting from the feedback signal described above, so that the frequency jitter control modulation effect is undesirably canceled.

As related-art technologies that solve the problems, there are technologies disclosed, for example, in Japanese Unexamined Patent Application Publication No. 2014-204544 and Japanese Patent No. 5,899,504.

In the switching power supply device disclosed in Japanese Unexamined Patent Application Publication No. 2014-204544, in the case where a change in the switching frequency resulting from the feedback signal control cancels a change in the switching frequency resulting from the modulation signal in the PFM control, setting the amplitude of the modulation signal at a large value can prevent a decrease in the frequency jitter modulation effect, whereby the noise can be effectively reduced.

The switching power supply device disclosed in Japanese Patent No. 5,899,504 is configured so that in the PFM control, the feedback signal controls the timing when the switching element is turned on, the modulation signal controls the timing when the switching element is turned off, and the feedback signal and the modulation signal are controlled to be input separately from each other. As a result, the feedback signal and the modulation signal do not cancel each other, whereby a decrease in the frequency jitter modulation effect can be avoided, and the noise can therefore be effectively reduced.

In the switching power supply device of the related art disclosed in Japanese Unexamined Patent Application Publication No. 2014-204544, enhancing the turn-on timing modulation in the PFM control region can prevent a decrease in the frequency jitter modulation effect. In the complex control in which the PFM control and the PWM control are switched from one to the other, however, the frequency jitter modulation amplitude, that is, the turn-on timing modulation amplitude is switched at the boundary between the PFM control and the PWM control, the control is likely to be unstable in a case where the load acts at the boundary between the PFM control and the PWM control. To stabilize the operation at the boundary, Japanese Unexamined Patent Application Publication No. 2014-204544 discloses that a hysteresis is imparted to the modulation amplitude switching control. In part of the PFM control after the PWM control is switched to the PFM control, however, the presence of a region where the modulation effect is small causes deterioration of the conducted EMI in the power supply.

In the switching power supply device of the related art disclosed in Japanese Patent No. 5,899,504, the turn-on timing modulation is performed in the PWM control, and the turn-off timing modulation is performed in the PFM control, but the stability of the control switching is not clearly stated. Further, in the case where the two methods, the turn-on timing modulation and the turn-off timing modulation, are simultaneously switched from one to the other at the switching boundary, the control is likely to be unstable.

An object of the present disclosure is to solve the problems described above and provide a switching power supply device having a frequency jitter control function that provides a high noise reduction effect of reducing noise produced by a switching power supply in complex control including frequency changing control and frequency fixing control.

A switching power supply device and a semiconductor device according to embodiments of the present disclosure will be described below with reference to the drawings. However, the description will not be made in detail in some cases. For example, a detailed description of an already well-known item and a redundant description of substantially the same configuration are omitted in some cases. The reason for this is that the following description will not be unnecessarily redundant to allow a person skilled in the art to readily understand the description.

The accompanying drawings and the following description are intended to allow a person skilled in the art to fully understand the present disclosure but are not intended to limit the subject set forth in the claims.

Embodiment 1

A switching power supply device and a semiconductor device according to Embodiment 1 will be specifically described below with reference to FIGS. 1 to 10.

Figure 1:
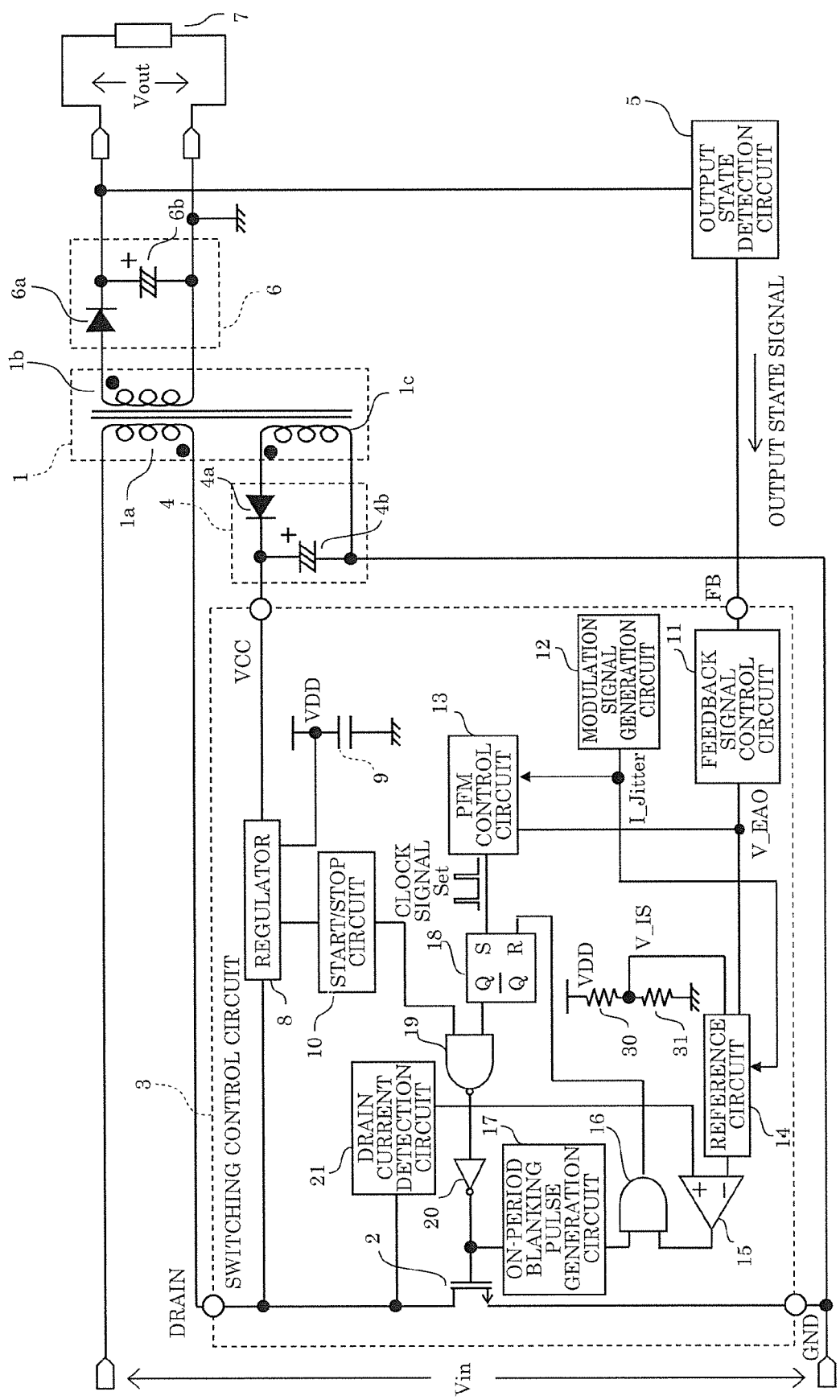
FIG. 1 is a circuit diagram showing an example of the configuration of a switching power supply device according to Embodiment 1.

FIG. 1 is a circuit diagram showing a configuration of the switching power supply device including a semiconductor device for switching control according to Embodiment 1.

In FIG. 1, transformer 1 includes primary windings 1a, secondary windings 1b, and auxiliary windings 1c, and the polarity of primary windings 1a is opposite the polarity of secondary windings 1b. The switching power supply device is of a flyback type.

Switching element 2, which forms part of switching control circuit 3, is connected to primary windings 1a. Changing voltage applied to a control electrode (gate) of switching element 2 controls the switching operation of switching element 2.

Output rectifying/smoothening circuit 6, which is formed of rectifying diode 6a and smoothening capacitor 6b, is connected to secondary windings 1b, and when output rectifying and smoothening circuit 6 rectifies and smoothens AC voltage induced in secondary windings 1b by the switching operation of switching element 2, output DC voltage Vout is generated and supplied and applied to load 7.

Switching control circuit 3 including switching element 2 is an integrated circuit formed on a single semiconductor substrate and forms a single semiconductor device. Switching element 2 is formed, for example, of a power MOSFET.

In switching control circuit 3, switching element 2 and the portion excluding switching element 2 may not be provided on the same semiconductor substrate. For example, switching control circuit 3 may include two semiconductor substrates; one of the semiconductor substrates on which the portion excluding switching element 2 is disposed may be provided with an output terminal via which the portion outputs a control signal, and the output terminal may be connected to the gate of switching element 2 disposed on the other semiconductor substrate.

Switching control circuit 3 has four terminals each serving as an external input/output terminal, a DRAIN terminal, an FB terminal, a VCC terminal, and a GND terminal. Switching control circuit 3 is further formed, for example, of switching element 2, regulator 8, start/stop circuit 10, feedback signal control circuit 11, modulation signal generation circuit 12, PFM control circuit 13, reference circuit 14, on-period blanking pulse generation circuit 17, and drain current detection circuit 21.

The DRAIN terminal is the point where primary windings 1a of transformer 1 is connected to switching element 2, that is, a terminal connected to the drain of switching element 2.

In the present disclosure, switching element 2 may instead be a power switching element different from a power MOSFET. For example, in a case where an IGBT (insulated gate bipolar transistor) is used as switching element 2, the terminals of switching element 2 are called the "collector" and "emitter" instead of the "drain" and "source."

The VCC terminal is a terminal that connects the output from rectifying and smoothening circuit 4, which is formed of rectifying diode 4a and smoothening capacitor 4b, which are connected to auxiliary windings 1c of transformer 1, to regulator 8 built in switching control circuit 3. AC voltage induced in auxiliary windings 1c is rectified and smoothened by the switching operation of switching element 2, and the resulting electric power is supplied as auxiliary power supply voltage VCC via the VCC terminal to switching control circuit 3.

The FB terminal is a terminal via which an output state signal (feedback signal, such as current from photocoupler, for example) output from output state detection circuit 5 is input to feedback signal control circuit 11 in switching control circuit 3.

Instead of inputting the output state signal to the FB terminal, auxiliary power supply voltage VCC, which is the AC voltage induced in auxiliary windings 1c of transformer 1 and rectified and smoothened, may be input via output state detection circuit 5 to feedback signal control circuit 11 in switching control circuit 3.

The GND terminal is a terminal that connects the source of switching element 2 and GND, which is the potential reference of switching control circuit 3, to the ground level, and the GND terminal is connected to one of two terminals to which input DC voltage Vin is applied or a low-potential terminal.

Regulator 8 is connected to the DRAIN terminal, the VCC terminal, start/stop circuit 10, smoothening capacitor 9, and internal circuit voltage source VDD in switching control circuit 3.

To start the switching power supply device, when input DC voltage Vin is input to the DRAIN terminal of switching element 2 via primary windings 1a of transformer 1, startup current flows via the DRAIN terminal and through regulator 8 to smoothening capacitors 4b and 9.

When smoothening capacitors 4b and 9 are charged, the VCC terminal voltage and the VDD voltage increase, and when the VCC terminal voltage and the VDD voltage each reach startup voltage, regulator 8 blocks the startup current.

At this point, the VCC terminal voltage corresponds to the voltage resulting from rectification and smoothening of the voltage across auxiliary windings 1c of transformer 1, that is, the voltage that charges smoothening capacitor 4b. When the VCC terminal voltage lowers to the voltage at which switching control circuit 3 stops operating, the current is supplied via the DRAIN terminal to the VCC terminal, as in the state before the startup, and the VCC terminal voltage rises again. Internal circuit voltage source VDD is so controlled by regulator 8 as to be constant voltage.

Start/stop circuit 10 monitors the VCC terminal voltage and controls whether switching element 2 starts or stop operating based on the magnitude of the VCC terminal voltage. When the VCC terminal voltage reaches the startup voltage described above, start/stop circuit 10 outputs level H to one of the input terminals of NAND circuits 19, whereas outputting level L when the VCC terminal voltage lowers to the stop voltage described above, at which switching control circuit 3 stops operating. The "level H" corresponds to a predetermined voltage level higher than 0 V, and the "level L" corresponds to a predetermined voltage level higher than or equal to 0 V but lower than "level H."

Feedback signal control circuit 11, to which the output state signal output from output state detection circuit 5 is input via the FB terminal, sets the current flowing through switching element 2 or the switching frequency of switching element 2 in such a way that output DC voltage Vout is so stabilized as to be constant.

Figure 2:
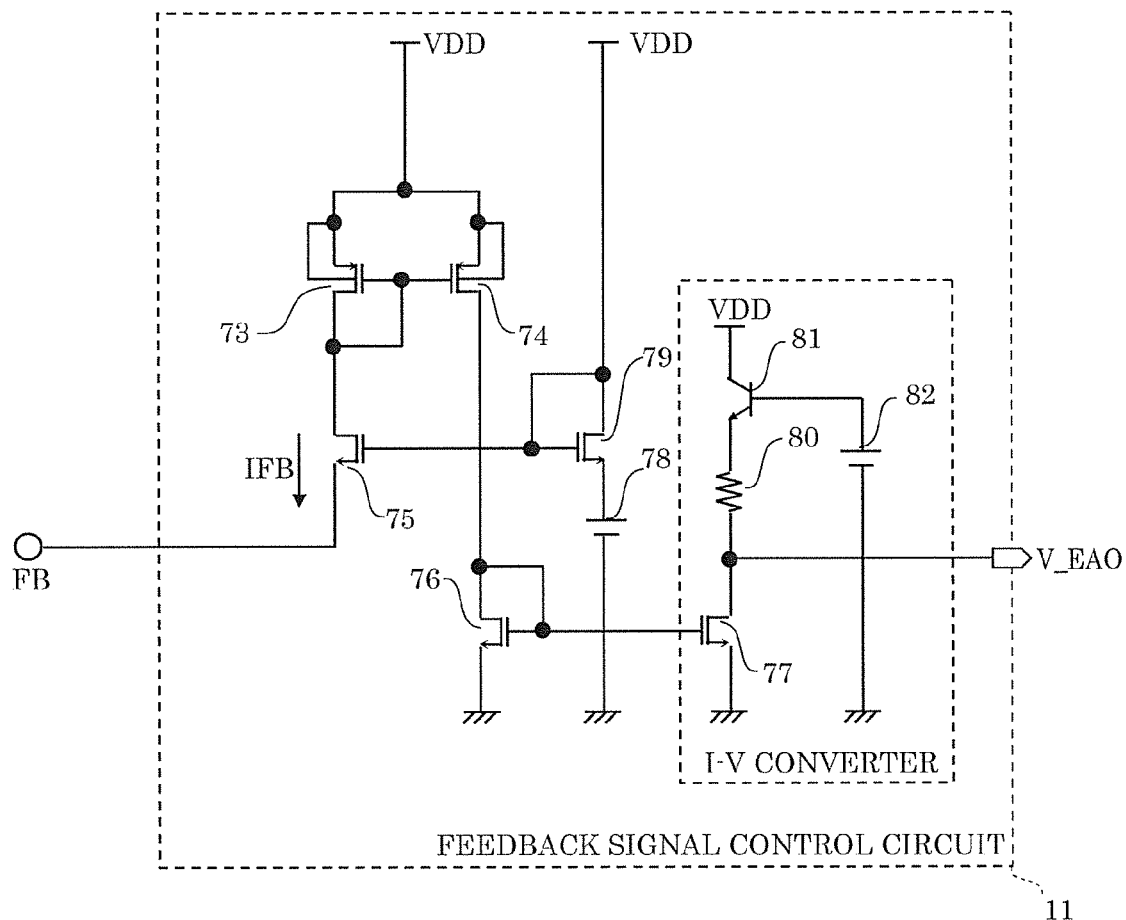
FIG. 2 is a circuit diagram showing a configuration of a feedback signal control circuit according to Embodiment 1.

FIG. 2 is a circuit diagram showing a configuration of feedback signal control circuit 11 in Embodiment 1.

Feedback signal control circuit 11 is formed of P-type MOSFETs 73 and 74, N-type MOSFETs 75, 76, 77, and 79, constant voltage sources 78 and 82, resistor 80, and NPN bipolar transistor 81, and N-type MOSFET 77, resistor 80, NPN bipolar transistor 81, and constant voltage source 82 form an I-V converter. The pairs of P-type MOSFETs 73 and 74, N-type MOSFETs 75 and 79, and N-type MOSFETs 76 and 77 each form a mirror circuit.

The voltage of output V_EAO having undergone voltage conversion in the I-V converter is determined by the current flowing through resistor 80 and changes in accordance with the following Expression (1):

$$V\_EAO = VR - Vbe - R \times I \qquad (1)$$

In Expression (1), V_EAO represents the output voltage from the I-V converter, VR represents the value of the constant voltage from constant voltage source 82, Vbe represents the B-E voltage between the base and the emitter of NPN bipolar transistor 81, R represents the resistance of resistor 80, and I represent the current flowing through resistor R.

As seen from Expression (1), the greater the current I flowing through resistor R, the lower the output voltage V_EAO.

Output voltage V_EAO from feedback signal control circuit 11 is input to PFM control circuit 13 and reference circuit 14, and the current flowing through switching element 2 and the switching frequency of switching element 2 are controlled based on output voltage V_EAO.

Modulation signal generation circuit 12 inputs current modulation signal I_Jitter, which is formed of periodic current, to PFM control circuit 13 and reference circuit 14 to control turn-on timing modulation and turn-off timing modulation.

Figure 3:
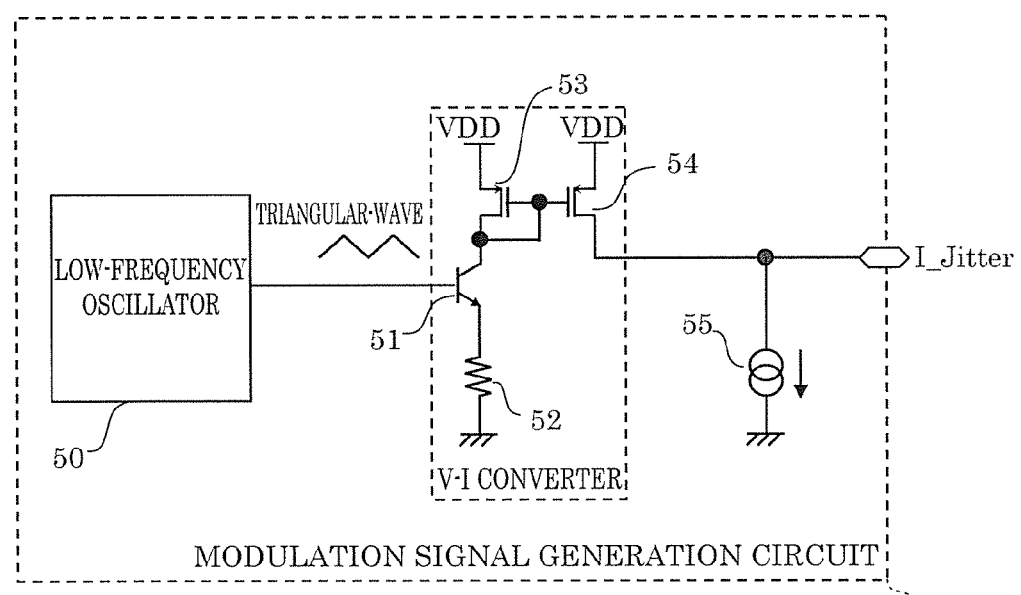
FIG. 3 is a circuit diagram showing a configuration of a modulation signal generation circuit according to Embodiment 1.

FIG. 3 is a circuit diagram showing a configuration of modulation signal generation circuit 12 in Embodiment 1.

In Modulation signal generation circuit 12, the V-I converter formed of NPN bipolar transistor 51, resistor 52, and P-type MOSFETs 53 and 54 converts triangular-wave voltage that is the output from low-frequency oscillator 50 into current and outputs the current as current modulation signal I_Jitter. Constant current source 55 for correction is so connected that the average of the current modulation signals forms a zero reference. Therefore, when the current modulation signal is positive with respect to the zero reference, the current flows out of output I_Jitter of modulation signal generation circuit 12, whereas when the current modulation signal is negative with respect to the zero reference, the current flows via output I_Jitter of modulation signal generation circuit 12 into constant current source 55.

Figure 4:
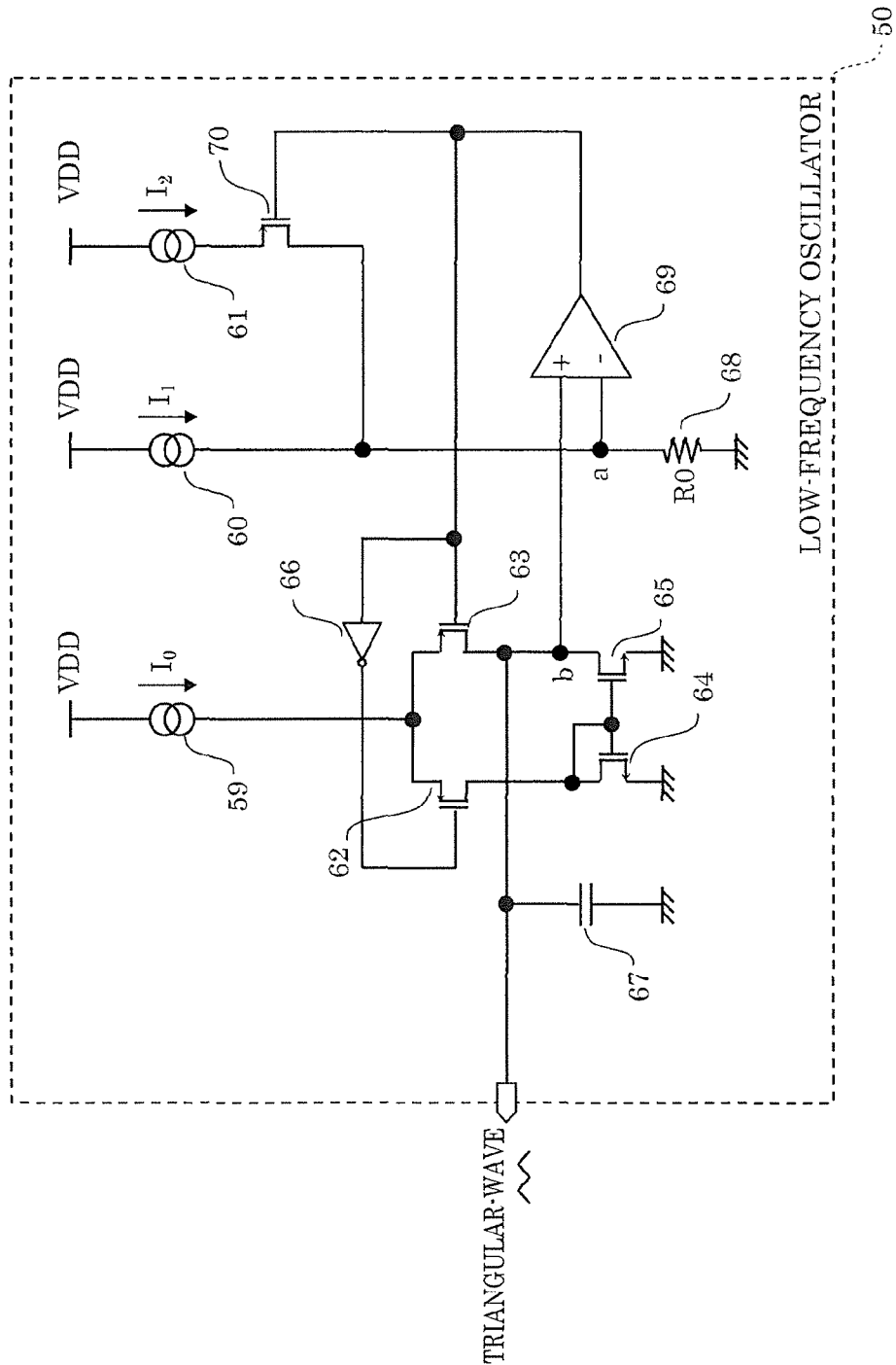
FIG. 4 a circuit diagram showing a configuration of a low-frequency oscillator according to Embodiment 1.

FIG. 4 is a circuit diagram showing a configuration of low-frequency oscillator 50 in Embodiment 1.

Low-frequency oscillator 50 is formed of constant current sources 59, 60, and 61, P-type MOSFETs 62, 63, and 70, N-type MOSFETs 64 and 65, inverter circuit 66, capacitor 67, resistor 68, and comparator 69. N-type MOSFETs 64 and 65 form a mirror circuit. In comparator 69, voltage Va at negative-side point a is determined by resistor 68 and constant current sources 60 and 61. Let R0 be the resistance of resistor 68 and $I_1$ and $I_2$ be the values of current from constant current sources 60 and 61, and when P-type MOSFET 70 operates in the OFF state, Va=$I_1$×R0, whereas when P-type MOSFET 70 operates in the OFF state, Va=$(I_1+I_2)$×R0.

Next, the operation of low-frequency oscillator 50 having the configuration shown in FIG. 4 will be described.

When the output signal from comparator 69 has the level L, P-type MOSFETs 63 and 70 both operate in the ON state. P-type MOSFET 62 operates in the OFF state because a level-H signal is input to the gate of P-type MOSFET 62 via inverter circuit 66. At this point, voltage Va at the negative input terminal of comparator 69 is Va=$(I_1+I_2)$×R0. Since P-type MOSFET 63 operates in the ON state, constant current Jo from constant current source 59 flows into capacitor 67 via P-type MOSFET 63. The voltage at point b, which is the positive input terminal of comparator 69, increases accordingly. When voltage Vb at point b exceeds $(I_1+I_2)$×R0, the output signal from comparator 69 switches to a signal having level L, and P-type MOSFETs 63 and 70 then each operate in the OFF state. At this point, voltage Va at the negative input terminal of comparator 69 switches to Va=$I_1$×R0.

When a level-L signal is input to the gate of P-type MOSFET 62 via inverter circuit 66 and the state of P-type MOSFET 62 switches to the ON state, constant current Jo from constant current source 59 flows into N-type MOSFET 64 via P-type MOSFET 62. Since N-type MOSFETs 64 and 65 form a mirror circuit, the current flowing into N-type MOSFET 65 also has value Jo, provided that the mirror circuit has a mirror ratio of, for example, 1.

The charge accumulated in capacitor 67 is therefore extracted by constant current Jo, resulting in a decrease in voltage Vb at point b. When voltage Vb at point b lowers to voltage $I_1$×R0 at point a, the output signal from comparator 69 has level L again.

When the operations described above are repeated, the triangular-wave voltage output from low-frequency oscillator 50 continuously changes at cycle TM over a voltage range ($I_2$×R0) from first voltage value ($I_1$×R0) to second voltage value (($I_1+I_2$)×R0).

Cycle TM at which low-frequency oscillator 50 oscillates desirably ranges from about 100 microseconds to several hundreds of milliseconds.

PFM control circuit 13 includes oscillator 100 therein and outputs clock signal Set for turning on switching element 2.

Figure 5:
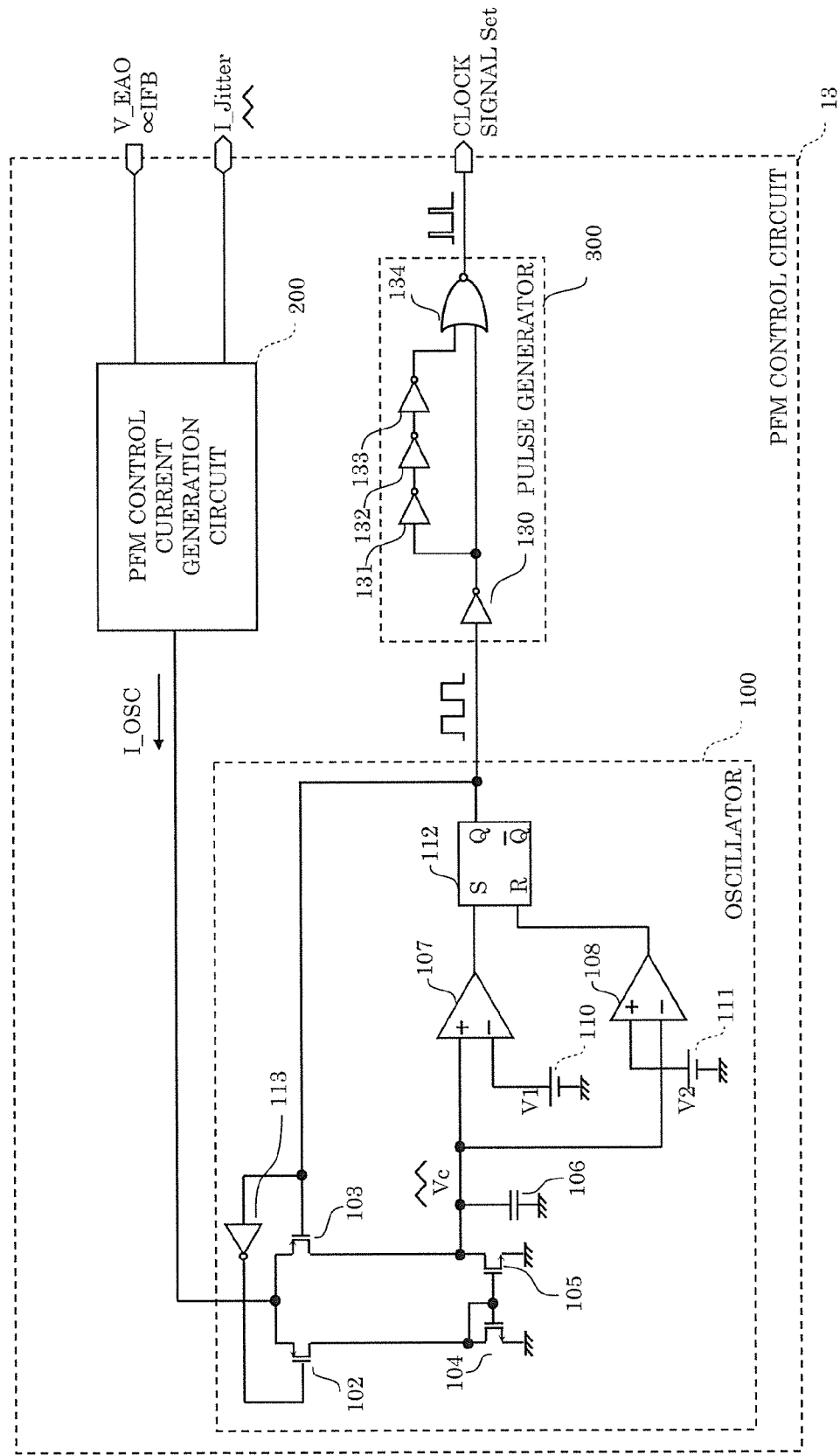
FIG. 5 is a circuit diagram showing a configuration of a PFM control circuit according to Embodiment 1.

FIG. 5 is a circuit diagram showing a configuration of PFM control circuit 13 in Embodiment 1.

PFM control circuit 13 is formed of oscillator 100, PFM control current generation circuit 200, and pulse generator 300, and oscillator 100 adjusts the frequency of clock signal Set by using current signal I_OSC output from PFM control current generation circuit 200.

Oscillator 100 is formed of P-type MOSFETs 102 and 103, N-type MOSFETs 104 and 105, capacitor 106, comparators 107 and 108, constant voltage sources 110 and 111, RS flip-flop circuit 112, and inverter circuit 113, and capacitor 106 is charged or discharged in accordance with the output state of RS flip-flop circuit 112.

When a level-H signal is input to the set (S) terminal of RS flip-flop circuit 112, the state of RS flip-flop circuit 112 becomes the set state. When the output signal (Q) from RS flip-flop circuit 112 has the signal level H, the output signal (Q) turns on P-type MOSFET 102 via inverter circuit 113, and current I_OSC flows through N-type MOSFET 104 via P-type MOSFET 102. Since N-type MOSFETs 104 and 105 form a mirror circuit, the current flowing into N-type MOSFET 105 also has the value I_OSC, provided that the mirror circuit has the mirror ratio of, for example, 1.

The charge accumulated in capacitor 106 is therefore discharged by current I_OSC, and voltage Vc across capacitor 106 decreases accordingly.

On the other hand, when a high signal is input to the reset (R) terminal of RS flip-flop circuit 112, the state of RS flip-flop circuit 112 becomes the reset state. When the output signal (Q) from RS flip-flop circuit 112 has the low signal level, current I_OSC charges capacitor 106 via P-type MOSFET 103 to increase voltage Vc across capacitor 106.

Comparator 107 detects that increasing voltage Vc across capacitor 106 has become greater than or equal to voltage V1 provided by constant voltage source 110 and causes RS flip-flop circuit 112 to operate in the set state so that capacitor 106 starts discharging.

Comparator 108 detects that decreasing voltage Vc across capacitor 106 has become smaller than or equal to voltage V2 provided by constant voltage source 111 and causes RS flip-flop circuit 112 to operate in the reset state so that capacitor 106 starts charging.

Voltage Vc across capacitor 106 therefore forms a triangular-wave voltage signal having an upper limit of voltage V1 and a lower limit of voltage V2.

Figure 6:
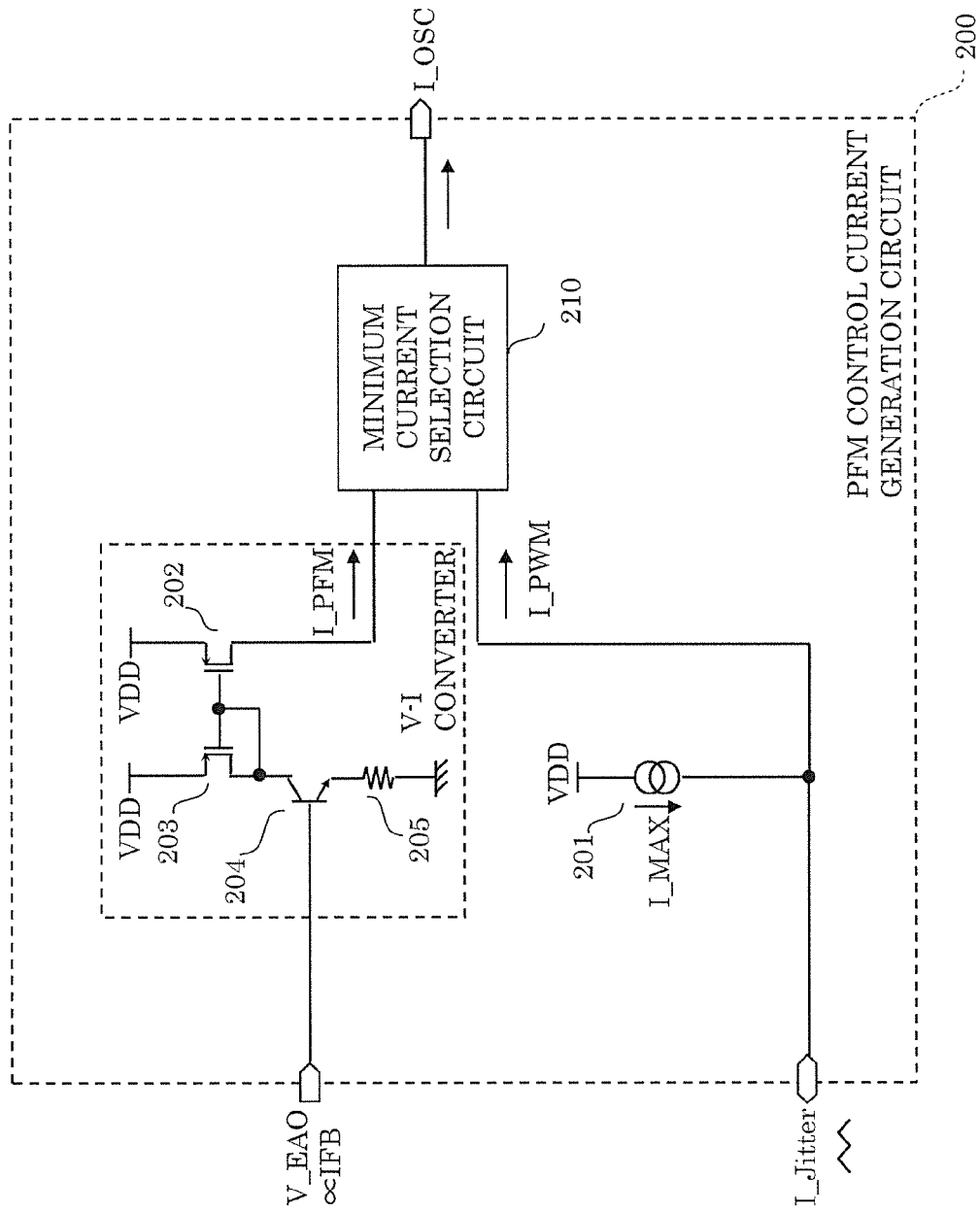
FIG. 6 is a circuit diagram showing a configuration of a PFM control current generation circuit according to Embodiment 1.

FIG. 6 is a circuit diagram showing a configuration of PFM control current generation circuit 200 in Embodiment 1.

PFM control current generation circuit 200 is formed of constant current source 201, P-type MOSFETs 202 and 203, NPN bipolar transistor 204, resistor 205, and minimum current selection circuit 210, and P-type MOSFETs 202 and 203, NPN bipolar transistor 204, and resistor 205 form a V-I converter.

The V-I converter converts voltage signal V_EAO, which is the output from feedback signal control circuit 11, into current signal I_PFM and inputs current signal I_PFM to minimum current selection circuit 210. That is, current signal I_PFM changes in accordance with the output state signal.

Current modulation signal I_Jitter is superimposed on constant current source 201 and input as current signal I_PWM to minimum current selection circuit 210. Current signal I_PWM does not change in accordance with the output state signal, but current modulation signal I_Jitter causes current signal I_PWM to be a current signal that periodically changes with respect to current I_Max flowing through constant current source 201.

Minimum current selection circuit 210 compares input current signal I_PFM and current signal I_PWM with each other and outputs smaller current as current signal I_OSC.

Current signal I_OSC is input to oscillator 100, and oscillator 100 outputs clock signal Set according to the output state signal via pulse generator 300.

Figure 7:
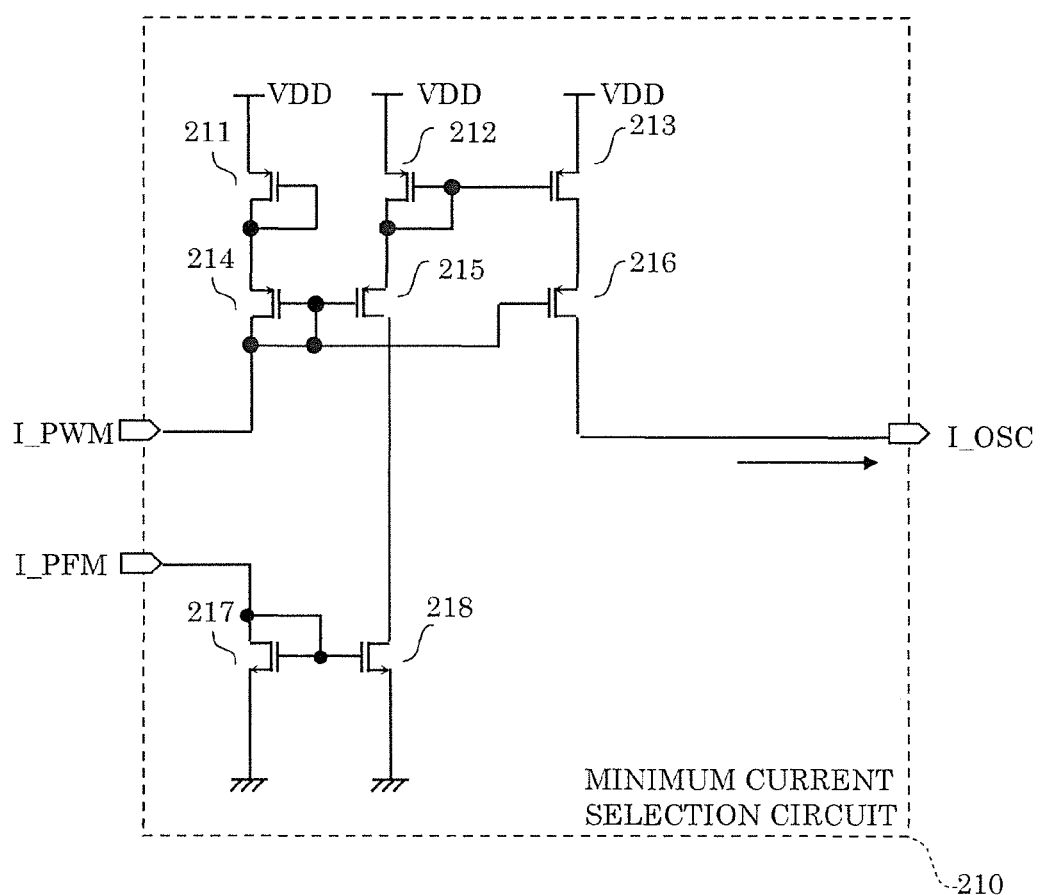
FIG. 7 is a circuit diagram showing a configuration of a minimum current selection circuit according to Embodiment 1.

FIG. 7 is a circuit diagram showing a configuration of minimum current selection circuit 210.

Minimum current selection circuit 210 is formed of P-type MOSFETs 211, 212, 213, 214, 215, and 216 and N-type MOSFETs 217 and 218.

The pairs of P-type MOSFETs 212 and 213 and N-type MOSFETs 217 and 218 each form a mirror circuit. Therefore, in a case where current signal I_PFM is smaller than current signal I_PWM, current I_OSC flowing through P-type MOSFET 213 is I_PFM, provided that the mirror ratio of each of the mirror circuits is 1.

On the other hand, the mirror circuit formed by P-type MOSFETs 214, 215, and 216 restricts the current flowing through P-type MOSFETs 215 and 216 to current signal I_PWM. Therefore, in a case current signal I_PFM is greater than current signal I_PWM, current I_OSC flowing through N-type MOSFET 213 is current signal I_PWM.

The operations described above allow the smaller one of current signal I_PWM and current signal I_PFM to be selected as current signal I_OSC output from minimum current selection circuit 210.

RS flip-flop circuit 18 shown in FIG. 1 operates in the set state when clock signal Set input to the set (S) terminal rises. When a reset signal is input to the reset (R) terminal of RS flip-flop circuit 18 via AND circuit 16, RS flip-flop circuit 18 operates in the reset state.

Gate driver 20 generates a drive output signal that drives the gate of switching element 2 based on the output signal from NAND circuit 19.

Specifically, when the voltage level of the drive output signal from gate driver 20 becomes the level H, switching element 2 is turned on, whereas when the voltage level of the drive output signal becomes the level L, switching element 2 is turned off.

NAND circuit 19 generates a computed signal indicating the result of computation performed on the output signal from RS flip-flop circuit 18 and the output signal from start/stop circuit 10.

Once the startup state is achieved, the output signal from start/stop circuit 10 has level H, and the input signal input to one of the input terminals of NAND circuit 19 has level H. When PFM control circuit 13 outputs clock signal Set, a pulse signal having level H is input to the set (S) terminal of RS flip-flop circuit 18. The output (Q) from RS flip-flop circuit 18 therefore has the level H, and the input signal input to the other input terminal of NAND circuit 19 also has the level H. At this point, since the output signal from NAND circuit 19 has level L, the output signal from gate driver 20 has level H, so that the state of switching element 2 transitions to the turn-on state.

Drain current detection circuit 21 is connected to the DRAIN terminal, detects ON voltage determined by the product of the drain current flowing through switching element 2 and ON-resistance of switching element 2 to detect the drain current flowing through switching element 2, generates a voltage signal proportional to the magnitude of the drain current, and outputs the voltage signal to the positive (+) input terminal of comparator 15.

A sense resistor may be provided at the source (ground side) of switching element 2 (such as power MOSFET) and detects the potential difference across the resistor, and a voltage signal indicating the potential difference may be output to the positive (+) input terminal of comparator 15.

A turn-off reference signal is input from reference circuit 14 to the negative (−) input terminal of comparator 15.

To control the turn-off operation of switching element 2, reference circuit 14 inputs a turn-off reference signal to the negative (−) input terminal of comparator 15. The turn-off reference signal is formed of voltage signal V_IS, which is the result of division of voltage VDD, which is accumulated in smoothening capacitor 9, by the resistance values of resistors 30 and 31, voltage signal V_EAO according to the output state signal, and current modulation signal I_Jitter.

Figure 8:
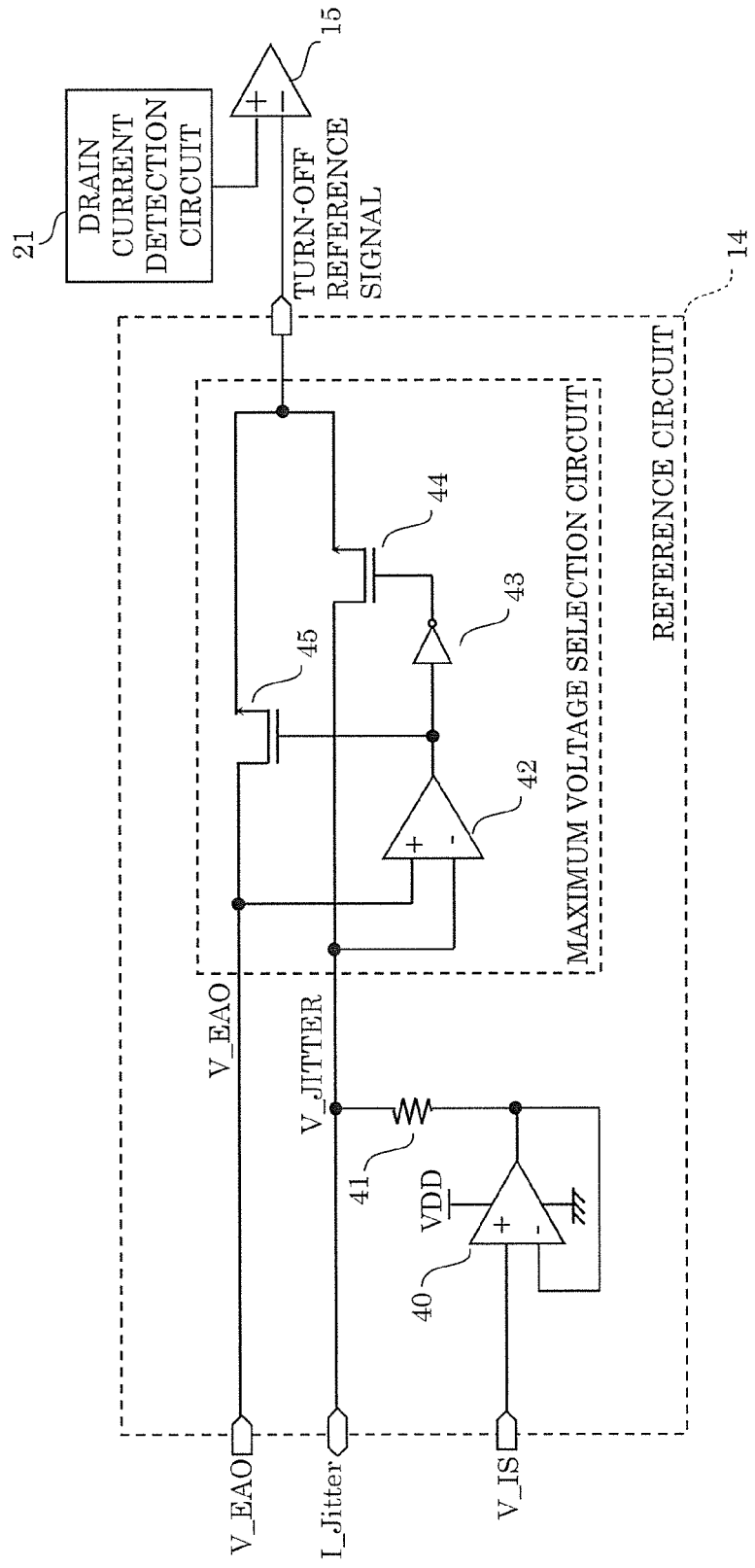
FIG. 8 is a circuit diagram showing a configuration of a reference circuit according to Embodiment 1.

FIG. 8 is a circuit diagram showing a configuration of reference circuit 14 in Embodiment 1.

Reference circuit 14 is formed of operational amplifier 40, resistor 41, comparator 42, inverter circuit 43, and N-type MOSFETs 44 and 45, and input voltage signal V_IS is converted in terms of impedance by operational amplifier 40. On the other hand, voltage signal V_Jitter, which is the sum of voltage signal V_IS and the potential difference that occurs when current modulation signal I_Jitter flows from modulation signal generation circuit 12 through resistor 41, is input to the negative (−) voltage input terminal of comparator 42 and drain of N-type MOSFET 44.

Voltage signal V_EAO output from feedback signal control circuit 11 is input to the positive (+) voltage input terminal of comparator 42 and the drain of N-type MOSFET 45. When voltage signal V_EAO is greater than voltage signal V_Jitter on the negative (−) side, the output signal from comparator 42 has level H, and N-type MOSFET 45 is therefore turned on, so that voltage signal V_EAO is output as the turn-off reference signal. N-type MOSFET 44 is turned off via inverter circuit 43.

On the other hand, when voltage signal V_EAO is smaller than voltage signal V_Jitter on the negative (−) side, the output signal from comparator 42 has level L, and N-type MOSFET 44 is turned on via inverter circuit 43, so that voltage signal V_Jitter is output as the turn-off reference signal. N-type MOSFET 45 is turned off.

The greater one of voltage signal V_EAO and voltage signal V_Jitter is therefore input as the turn-off reference signal to comparator 15 via a maximum voltage selection circuit and used as the reference voltage that determines the turn-off timing at which switching element 2 is turned off.

On-period blanking pulse generation circuit 17 shown in FIG. 1 is configured so that a constant blanking period is provided after gate driver 20 outputs the turn-on signal to switching element 2, which prevents false detection of capacitive spike current due to the capacitance of switching element 2 itself or any other type of current.

After the blanking period ends, a level-H signal is output from on-period blanking pulse generation circuit 17 to one of the input terminals of AND circuit 16.

After switching element 2 is turned on, the drain current is detected. When a voltage signal proportional to the magnitude of the drain current is equal to reference voltage set in advance, a level-H signal is output to the other one of the input terminals of AND circuit 16. Further, after the blanking period set by on-period blanking pulse generation circuit 17 elapses, the input signals input to AND circuit 16 both have level H. The output signal from AND circuit 16 therefore has the level H and is input to the reset (R) terminal of RS flip-flop circuit 18.

The level of the output (Q) from RS flip-flop circuit 18 therefore switches to level L, so that one of the inputs to NAND circuit 19 has level L, the output from NAND circuit 19 has level H, and the output signal from gate driver 20 has level L. Switching element 2 is therefore turned off.

Switching element 2 perform its switching operation in accordance with the signal processing described above.

Output state detection circuit 5 is formed, for example, of a detection resistor, a Zener diode, and a shunt regulator, detects the voltage level of output voltage Vout, and outputs an output state signal to switching control circuit 3 via, for example, a photocoupler so that output voltage Vout is so stabilized as to be predetermined voltage.

To detect output voltage Vout, flyback voltage induced in auxiliary windings 1c of transformer 1 may be used, or VCC voltage after the rectification and smoothening performed by rectifying diode 4a and smoothening capacitor 4b may be used.

In the switching power supply device, commercial AC electric power is rectified, for example, with a rectifier, such as a diode bridge, and smoothened with an input capacitor into DC voltage Vin, which is provided to primary windings 1a of transformer 1 for electric power conversion.

The operations of the switching power supply device and semiconductor device for switching control shown in FIG. 1 and configured as described above will be described.

When AC electric power, such as commercial electric power, is input, the input AC electric power is rectified and smoothened with a rectifier formed, for example, of a diode bridge and a smoothening capacitor and converted into input DC voltage Vin.

DC input voltage Vin is applied to the DRAIN terminal of switching control circuit 3 via primary windings 1a of transformer 1, and startup charging current flows through smoothening capacitor 4b, which is connected to the VCC terminal, via the DRAIN terminal through regulator 8.

When the VCC terminal voltage increases and reaches the startup voltage set by start/stop circuit 10, the switching control performed by switching element 2 starts.

Internal circuit voltage source VDD is so controlled by regulator 8 as to be constant voltage.

Once switching element 2 is turned on, current flows through switching element 2, and a voltage signal according to the magnitude of the current flowing through switching element 2 is input to the positive (+) input terminal of comparator 15.

After the blanking period set by on-period blanking pulse generation circuit 17 elapses, and when the output signal from drain current detection circuit 21 increases to a value greater than or equal to the reference voltage set in advance and input to negative (−) input terminal of comparator 15, a level-H signal is input to each of the input terminals of AND circuit 16. Therefore, AND circuit 16 outputs the level-H signal to the reset (R) terminal of RS flip-flop circuit 18, and switching element 2 is turned off.

When switching element 2 is turned off, the energy accumulated when current flows through primary windings 1a of transformer 1 during the turn-on period of switching element 2 is transmitted to secondary windings 1b.

The switching operation described above is repeated, and output voltage Vout increases. When output voltage Vout is greater than or equal to voltage set by output state detection circuit 5, output state detection circuit 5 causes current to flow out as the output state signal via the FB terminal of switching control circuit 3.

Feedback signal control circuit 11 adjusts the current flowing through switching element 2 or the switching frequency of switching element 2 based on the magnitude of the flow-out current.

Specifically, in a light load case in which a small amount of electric power is supplied to load 7, which is connected to the switching power supply device, the current flowing through switching element 2 or the switching frequency of switching element 2 is set to a small value, whereas in a heavy load case, the current flowing through switching element 2 or the switching frequency of switching element 2 is set to a large value. Switching control circuit 3 controls output voltage Vout in such a way that the output voltage Vout is so stabilized as to be predetermined voltage by changing the current flowing through switching element 2 or the switching frequency of switching element 2 in accordance with the electric power supplied to load 7, which is connected to the switching power supply device, as described above.

Figure 9:
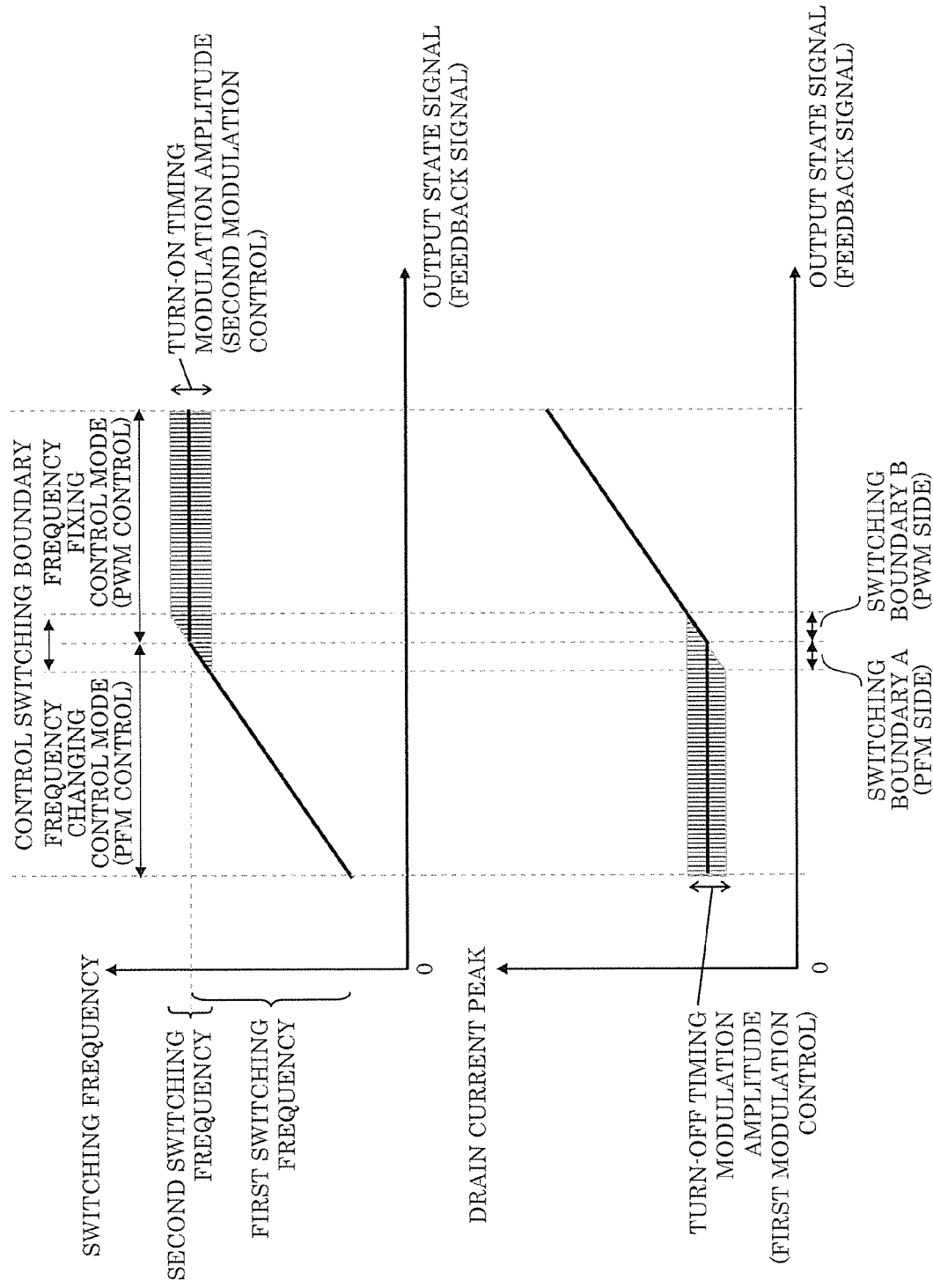
FIG. 9 shows an example of the relationship of the switching frequency and a peak value of drain current allowed to flow through a switching element versus an output state signal in a semiconductor device according to Embodiment 1.

The operation performed by the switching power supply device according to Embodiment 1 when load 7 changes will next be described with reference to a diagram shown in FIG. 9 and showing the relationship of the switching frequency of oscillator 100 and the drain current peak versus the output state signal.

Switching control circuit 3 switches a frequency changing control mode (PFM control) and a fixed frequency mode (PWM control) from one to the other in accordance with the output state signal.

The frequency changing control mode is a control mode in which the turn-on timing at which switching element 2 is turned on is controlled to change a first switching frequency, and the frequency changing control mode is also called PFM control.

The frequency fixing control mode is a control mode in which the switching operation of switching element 2 is performed at a second switching frequency that is a fixed frequency and the turn-off timing at which switching element 2 is turned off is controlled in accordance with the output state signal, and the frequency fixing control mode is also called PWM control.

Further, in the frequency changing control mode, switching control circuit 3 performs first modulation control in which the turn-off timing at which switching element 2 is turned off is so controlled by a first modulation signal that the first switching frequency is modulated. In the frequency fixing control mode, switching control circuit 3 performs second modulation control in which the second switching frequency is modulated by a second modulation signal.

Specifically, when load 7 and output state detection circuit 5 generate the output state signal, and the output state signal is input to feedback signal control circuit 11, the PFM control and the PWM control are switched from one to the other in accordance with the state of the load.

In a switching power supply that operates in accordance with the PFM control in the case of a light load and operates in accordance with the PWM control in the case of a heavy load, when load 7 increases and the PFM control is completely switched to the PWM control, the frequency of clock signal Set output from PFM control circuit 13 is set to a fixed value (100 kHz, for example), and the current flowing through switching element 2 is so controlled as to increase as the load increases in accordance with the output state signal from output state detection circuit 5, that is, the current flowing out of the FB terminal.

Further, at a switching frequency in the PWM region, the turn-on timing is periodically modulated, and at the drain current peak in the PFM region, the turn-off timing is periodically modulated.

Specifically, the I-V converter in feedback signal control circuit 11 generates voltage signal V_EAO according to the output state signal, and PFM control current generation circuit 200 converts voltage signal V_EAO into current signal I_PFM, which is input to minimum current selection circuit 210.

Current modulation signal I_Jitter generated by modulation signal generation circuit 12 is superimposed on current I_MAX flowing through constant current source 201, and the resultant signal is input as current signal I_PWM to minimum current selection circuit 210. Current signal I_PWM does not change in accordance with the output state signal, but current modulation signal I_Jitter causes current signal I_PWM to be a current signal that periodically changes with respect to current I_Max.

Minimum current selection circuit 210 compares the current value of input current signal I_PFM with the current value of current signal I_PWM and outputs a smaller one as current signal I_OSC.

Current signal I_OSC is input to oscillator 100 in PFM control circuit 13, and oscillator 100 outputs clock signal Set according to the output state signal via pulse generator 300.

That is, the greater the output state signal, which is the current flowing out of the FB terminal, the smaller voltage signal V_EAO, and the switching frequency of switching element 2 lowers accordingly. Further, the smaller the output state signal, which is the current flowing out of the FB terminal, the greater voltage signal V_EAO, and the switching frequency of switching element 2 rises accordingly.

Further, minimum current selection circuit 210 clamps the switching frequency of switching element 2 at a switching frequency determined by current signal I_PWM.

Therefore, when the frequency fixing control mode is switched to the frequency changing control mode, switching control circuit 3 continues the second modulation control which is performed in the frequency fixing control mode, even after the frequency fixing control mode is switched to the frequency changing control mode. Specifically, at a switching boundary A (PFM side) and a switching boundary B (PWM side) shown in FIG. 9, since the switching frequency is determined by the smaller one of current signal I_PWM, which causes the turn-on timing to be periodically modulated, and current signal I_PFM, which changes in accordance with the output state signal, load 7 decreases. When the PWM controls is switched to the PFM control, the turn-on timing modulation amplitude gradually decreases beyond the switching boundary B (PWM side), and when load 7 further decreases beyond the switching boundary A (PFM side), the turn-on timing modulation amplitude becomes zero in the PFM control. In other words, when the frequency fixing control mode is switched to the frequency changing control mode, switching control circuit 3 continues the second modulation control which is performed in the frequency fixing control mode, even after the frequency fixing control mode is switched to the frequency changing control mode. Further, switching control circuit 3 gradually decreases the turn-on timing modulation amplitude in the second modulation control in a segment including the point of time when the frequency fixing control mode is switched to the frequency changing control mode (segment shown by switching boundary A and switching boundary B, for example) and sets the turn-on timing modulation amplitude at zero at the end of the segment described above.

Therefore, when the PWM control is switched to the PFM control, the turn-on timing modulation is continuously performed, and the turn-on timing modulation amplitude is continuously and moderately decreased, whereby a stable operation of switching element 2 is achieved at the switching boundary.

On the other hand, voltage signal V_EAO and current modulation signal I_Jitter from modulation signal generation circuit 12 are also input to reference circuit 14 and control the turn-off timing at which switching element 2 is turned off.

In reference circuit 14, the greater one of voltage signal V_EAO and voltage signal V_Jitter is input as the turn-off reference signal to comparator 15 via the maximum voltage selection circuit and controls turning off operation of turning off switching element 2. Therefore, when the frequency changing control mode is switched to the frequency fixing control mode, switching control circuit 3 continues the first modulation control which is performed in the frequency changing control mode, even after the frequency changing control mode is switched to the frequency fixing control mode. Specifically, as for the turn-off timing modulation, that is, the drain current perk, the turn-off timing modulation amplitude gradually decreases beyond the switching boundary A (PFM side), and when load 7 further increases beyond the switching boundary B (PWM side), the turn-off timing modulation amplitude becomes zero in the PWM control, as in the switching frequency control described above. In other words, when the frequency changing control mode is switched to the frequency fixing control mode, switching control circuit 3 continues the first modulation control which is performed in the frequency changing control mode, even after the frequency changing control mode is switched to the frequency fixing control mode. Further, switching control circuit 3 gradually decreases the turn-off timing modulation amplitude in the first modulation control in a segment including the point of time when the frequency changing control mode is switched to the frequency fixing control mode (segment shown by switching boundary A and switching boundary B, for example) and sets the turn-off timing modulation amplitude at zero at the end of the segment described above.

Therefore, when the PFM control is switched to the PWM control, the turn-off timing modulation is continuously performed, and the turn-off timing modulation amplitude is continuously and moderately decreased, whereby a stable operation of switching element 2 is achieved at the switching boundary.

Figure 10:
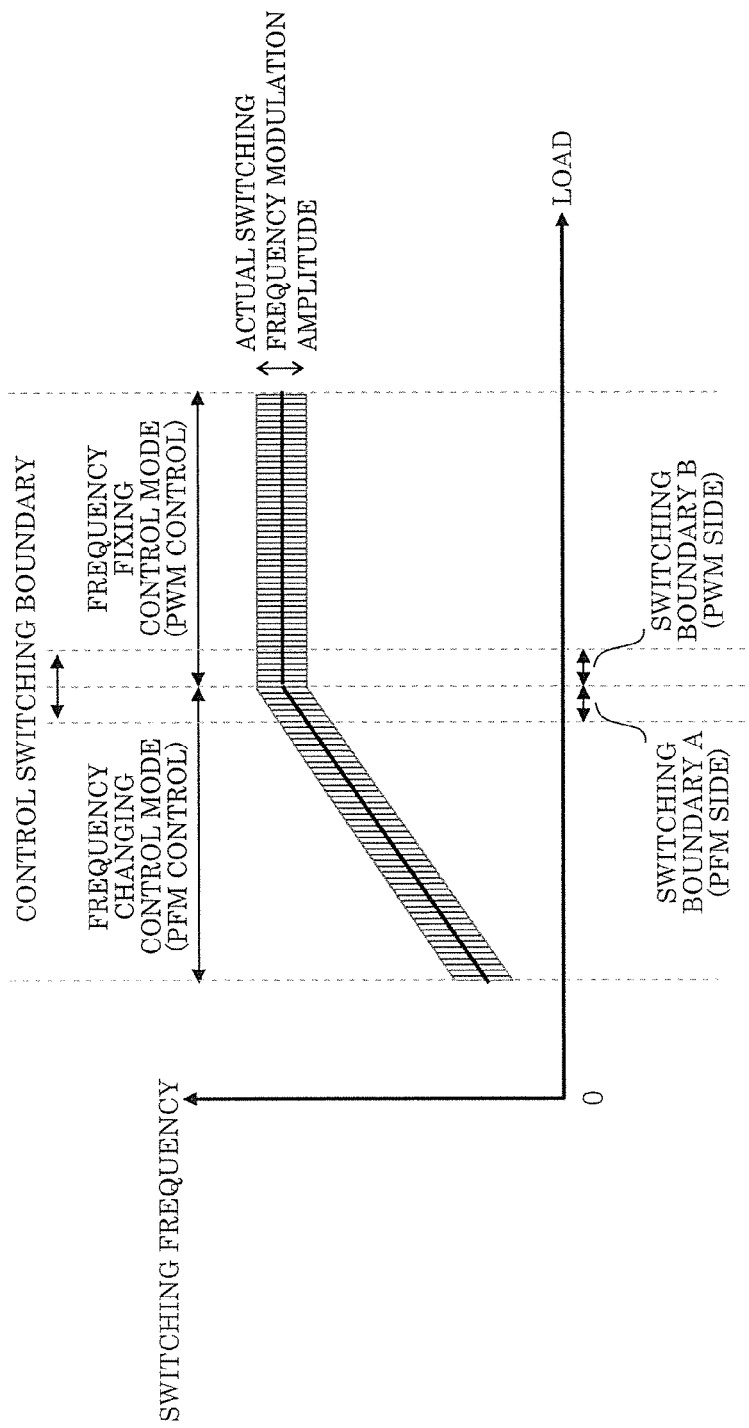
FIG. 10 shows the relationship of the power supply switching frequency versus the load in the switching power supply device according to Embodiment 1.

FIG. 10 shows the relationship between the switching frequency in the actual power supply operation and the load in the switching power supply device according to Embodiment 1. FIG. 9 shows the operation of switching control circuit 3, whereas FIG. 10 shows the actual switching frequency and a modulation amplitude under feedback response control as a switching power supply.

The turn-off timing modulation in the PFM control periodically changes the peak of the drain current in switching element 2. Output state detection circuit 5 detects periodic variation in the amount of electric power supplied to load 7. Feedback signal control circuit 11 and PFM control circuit 13 periodically change the switching frequency of the actual power supply operation.

Further, in the complex control described above including the turn-on timing modulation and the turn-off timing modulation, gradually decreasing the modulation amplitude at the control switching boundary allows the switching frequency to continuously change at the control switching boundary.

The switching power supply device according to Embodiment 1, which performs both the turn-on timing modulation and the turn-off timing modulation, performs the turn-off timing modulation in the PFM control region whereas performing the turn-on timing modulation in the PWM control region to allow effective frequency dispersion with no decrease in the frequency jitter control modulation effect across the entire operation region from the PFM control to the PWM control for a decrease in conducted EMI. Further, even after the PFM control and the PWM control are switched from one to the other, at least one of the modulations is continuously performed in the vicinity of the switching boundary to achieve a stable operation of the switching power supply device at the boundary.

In control in which the switching frequency changes in accordance with a load, the PFM control described in Embodiment 1 is not required. Examples of such control include quasi-resonant control and PFM control with the duty or the period fixed.

In the case of a heavy load side, the description has been made with reference to the current-mode PWM control, and voltage-mode PWM control may instead be performed. Further, instead of the constant voltage control in which output voltage Vout across load 7 is so stabilized as to be predetermined voltage, the constant voltage control may be combined, for example, with constant current control in which the current flowing through load 7 is so stabilized as to be predetermined current.

Contrary to Embodiment 1, the PWM control may be performed in the case of a light load side, and the PFM control may be performed in the case of a heavy load side. In this case, the minimum current selection circuit is desirably replaced with a maximum current selection circuit in PFM control current generation circuit 200. Further, the maximum voltage selection circuit is desirably replaced with a minimum voltage selection circuit in reference circuit 14.

Comparator 42 in reference circuit 14 may have a hysteresis for false positive prevention and operation stabilization.

As the output state signal from output state detection circuit 5, current is extracted via the FB terminal, and current may, instead, be injected via the FB terminal. Further, the output state signal may not be detected from secondary-side output voltage Vout and may instead be detected from the voltage induced in auxiliary windings 1c of transformer 1 or the voltage at the VCC terminal after the rectification and smoothening.

The configuration of the flyback-type switching power supply device has been described, and a forward-type switching power supply device, a stepdown-chopper-type switching power supply device, a switching power supply device having a different topology may be employed.

The turn-on timing modulation and the turn-off timing modulation may not be synchronized with each other. For example, current modulation signal I_Jitter from modulation signal generation circuit 12 is common to the turn-on timing modulation and the turn-off timing modulation. Instead, separate current modulation signals may be generated, for example, from separate modulation signal generation circuits, and the turn-on timing modulation and the turn-off timing modulation may be independently controlled.

A minimum switching frequency in the PFM control region may be set to prevent the switching frequency from falling within the audible region. In a case where the load further decreases, the PWM control is performed again to lower the drain current peak for adjustment of the electric power supplied to load 7. Instead, the PFM control may be caused to transition, for example, to intermittent oscillation (burst) control.

Embodiment 2

A switching power supply device and a semiconductor device according to Embodiment 2 will next be described with reference to FIGS. 11, 12, 13, 14, and 15.

In Embodiment 1, since the switching frequency and the drain current peak are clamped at the maximum switching frequency and the minimum drain current peak value in the vicinity of the boundary when the output state signal changes, the turn-off timing modulation and the turn-on timing modulation are each configured so that the amount of modulation substantially and gradually decreases to zero in the vicinity of the switching boundary between the PWM control and the PFM control. Embodiment 2 will be described with reference to a switching power supply device configured so that the switching between the PWM control and the PFM control is detected and the amount of modulation is gradually decreased from the switching boundary. No description that duplicates the description in Embodiment 1 will be made.

Figure 11:
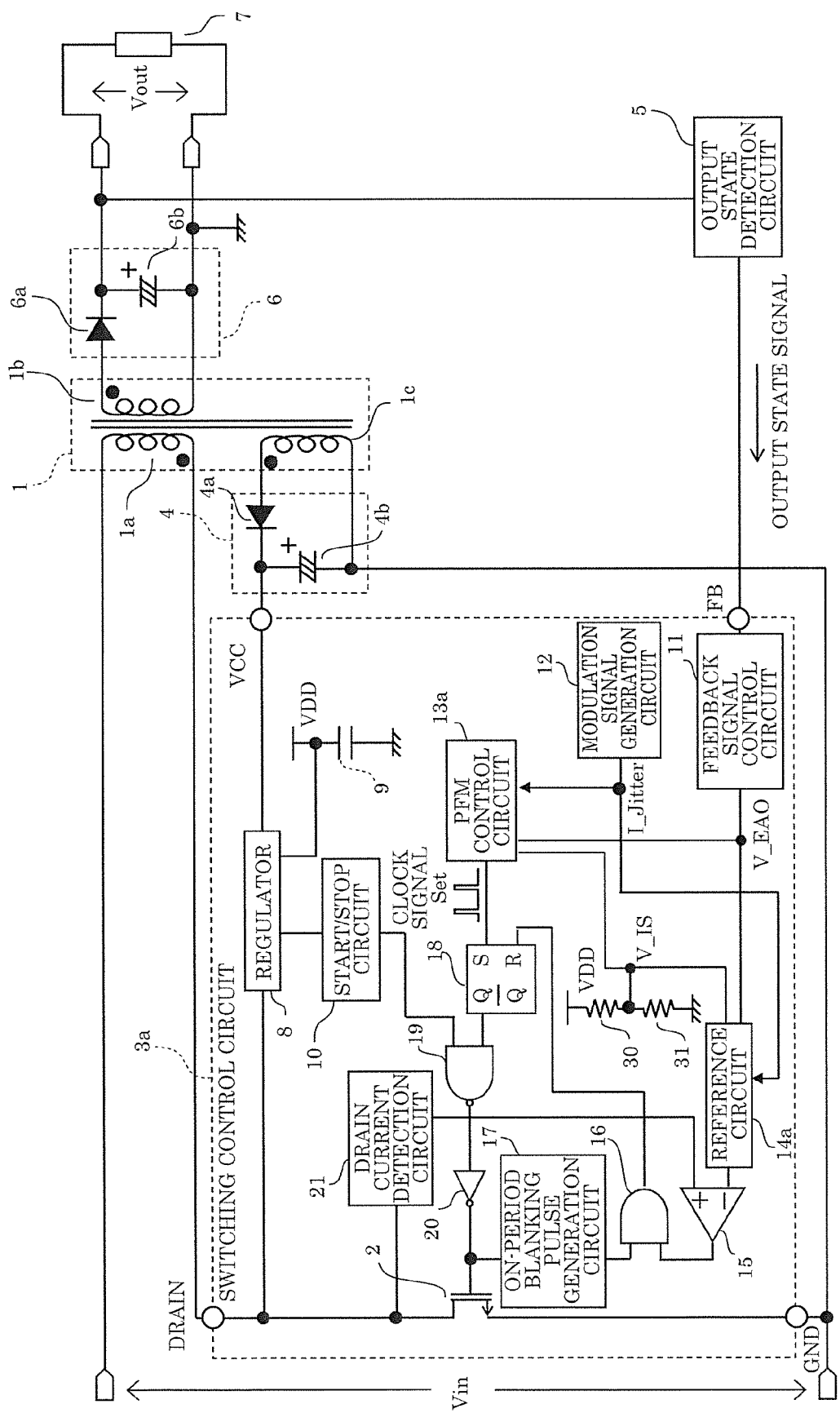
FIG. 11 is a circuit diagram showing an example of the configuration of a switching power supply device according to Embodiment 2.

FIG. 11 is a circuit diagram showing a configuration of the switching power supply device including a semiconductor device for switching control according to Embodiment 2. FIG. 11 differs from FIG. 1 showing the switching power supply device according to Embodiment 1 in that voltage signal V_IS in switching control circuit 3a is input to PFM control circuit 13a.

Figure 12:
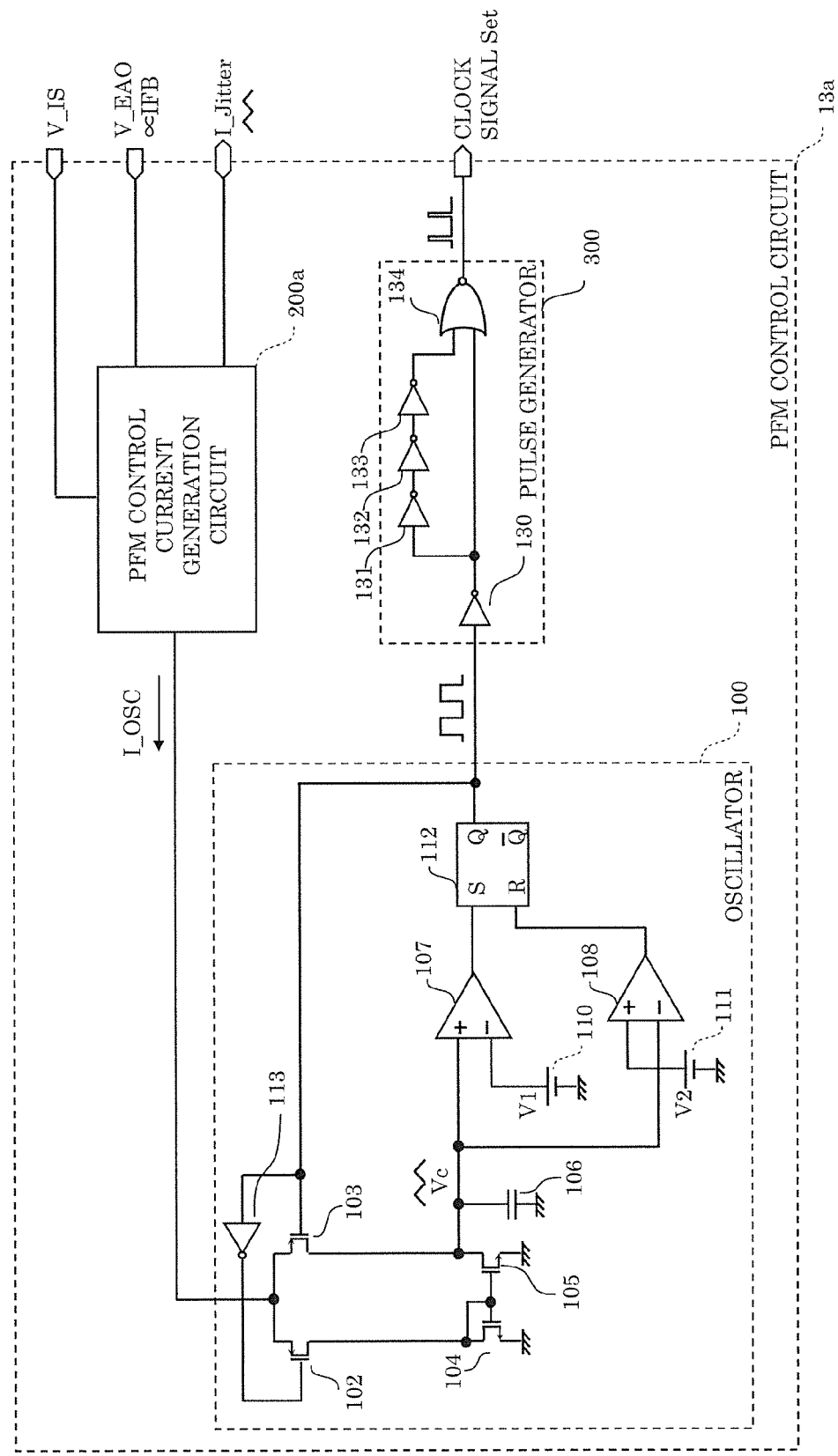
FIG. 12 is a circuit diagram showing a configuration of a PFM control circuit according to Embodiment 2.

FIG. 12 is a circuit diagram showing PFM control circuit 13a, which is an example of the configuration of PFM control circuit 13 in the switching power supply device according to Embodiment 2. FIG. 12 differs from FIG. 5 showing PFM control circuit 13 in Embodiment 1 in terms of PFM control current generation circuit 200a.

Figure 13:
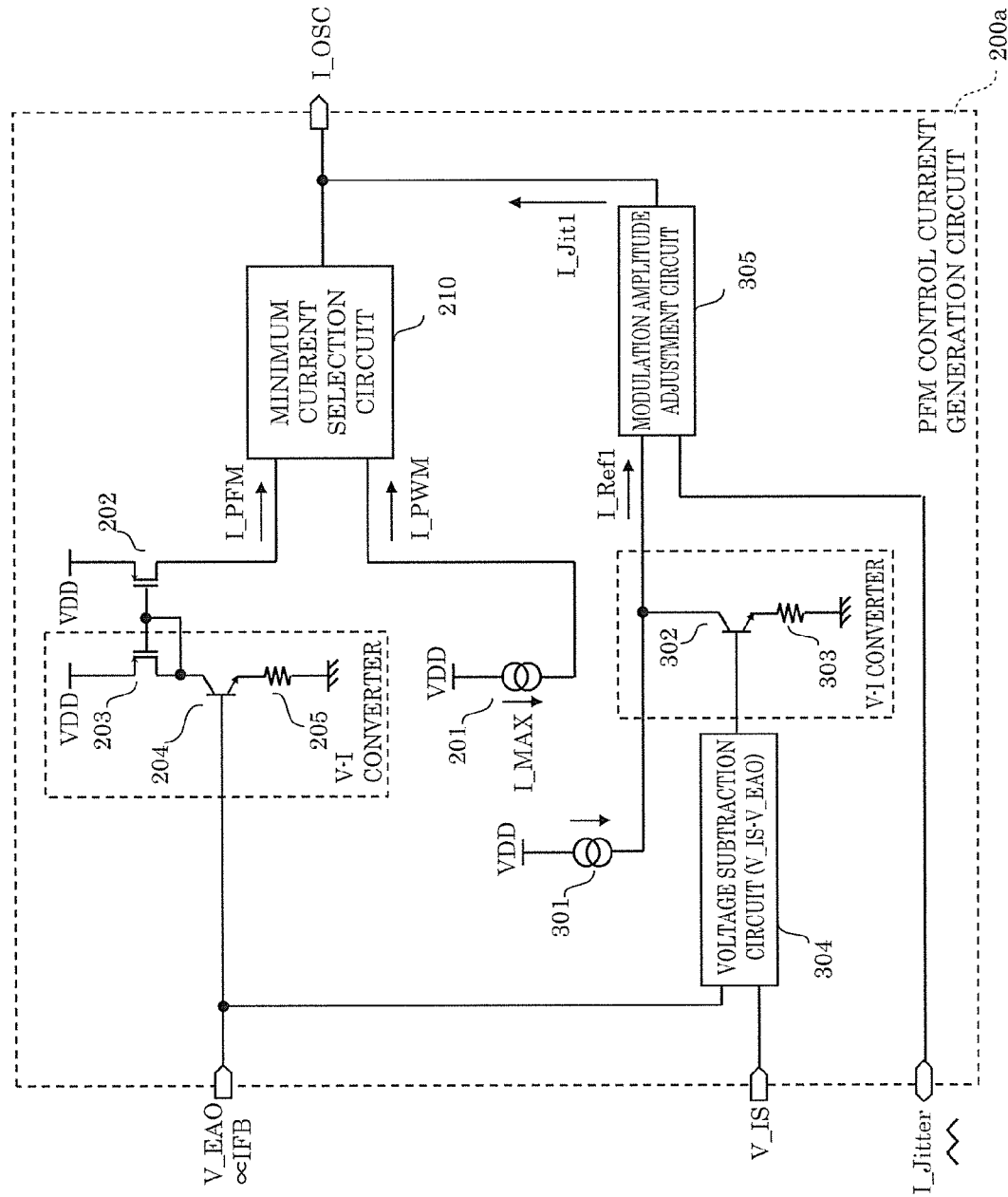
FIG. 13 is a circuit diagram showing a configuration of a PFM control current generation circuit according to Embodiment 2.

FIG. 13 is a circuit diagram showing PFM control current generation circuit 200a, which is an example of the configuration of PFM control current generation circuit 200 in PFM control circuit 13 in the switching power supply device according to Embodiment 1. As compared with FIG. 6 showing PFM control current generation circuit 200 in Embodiment 1, constant current source 301, NPN bipolar transistor 302, resistor 303, voltage subtraction circuit 304, and modulation amplitude adjustment circuit 305 are added, and current modulation signal I_Jitter is not superimposed on current I_MAX flowing through constant current source 201 but is input to modulation amplitude adjustment circuit 305.

In Embodiment 2, voltage subtraction circuit 304 generates differential voltage that is the result of subtraction of voltage signal V_EAO from voltage signal V_IS, and the differential voltage is input to the base of NPN bipolar transistor 302 and converted by the V-I converter into a current value. Constant current source 301 is connected to the collector of NPN bipolar transistor 302.

Since voltage signal V_IS is smaller than voltage signal V_EAO in the PWM region, the output voltage from voltage subtraction circuit 304 is lower than or equal to zero, and NPN bipolar transistor 302 is therefore turned off. The current flowing through resistor 303 is therefore substantially zero, and constant current source 301 is input with not change therein as current signal I_Ref1 to modulation amplitude adjustment circuit 305.

On the other hand, since voltage signal V_IS is greater than voltage signal V_EAO in the PFM region, the lower voltage signal V_EAO, the higher the output voltage from voltage subtraction circuit 304. That is, in the PFM region, the lower the switching frequency, the greater the current flowing through resistor 303, and when the current flowing through resistor 303 is greater than the current from constant current source 301, current signal I_ref1 is zero.

Modulation amplitude adjustment circuit 305 generates current signal I_Jit1, which is current modulation signal I_Jitter having an amplitude that changes in proportion to current signal I_Ref1, and current signal I_Jit1 is superimposed on the output from minimum current selection circuit 210.

Modulation amplitude adjustment circuit 305 is formed, for example, of a multiplication/division circuit based on current modulation signal I_Jitter and current signal I_Ref1, and in a case where voltage signal V_EAO increases and the current flowing through resistor 303 is zero, that is, in the case where the current from constant current source 301 directly forms current signal I_Ref1, modulation amplitude adjustment circuit 305 outputs a value equivalent to current modulation signal I_Jitter as current signal I_Jit1.

In a case where voltage signal V_EAO decreases and the current flowing through resistor 303 increases, when the current flowing through resistor 303 is greater than the current from constant current source 301, current signal I_ref1 is zero, and current signal I_Jit1 is also zero.

Figure 15:
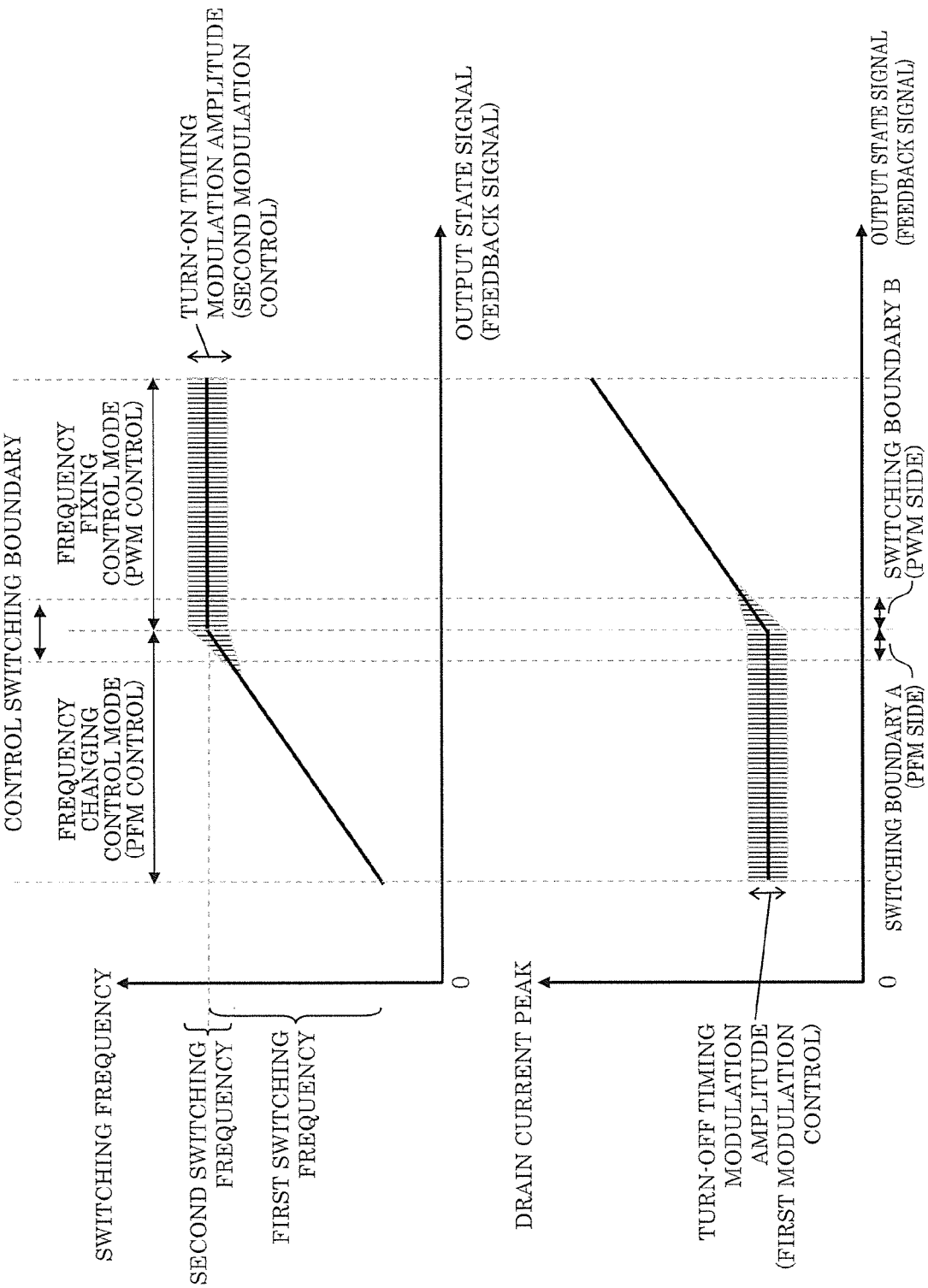
FIG. 15 shows an example of the relationship of the switching frequency and the peak value of drain current allowed to flow through the switching element versus the output state signal in a semiconductor device according to Embodiment 2.

The control described above allows turn-on timing modulation in which the amplitude gradually decreases in accordance with the output state signal after the PWM control is switched to the PFM control, as shown in FIG. 15.

Figure 14:
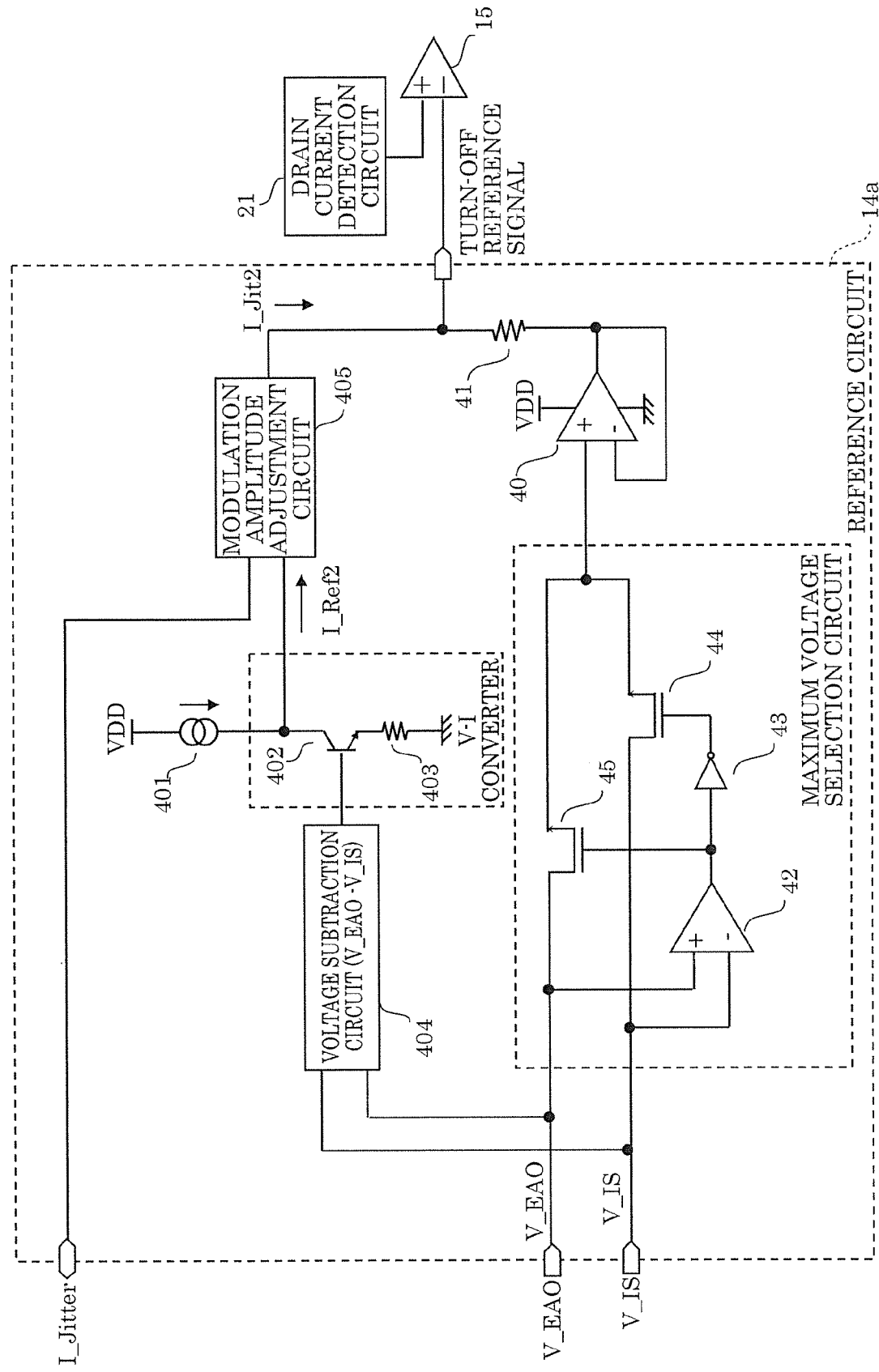
FIG. 14 is a circuit diagram showing a configuration of a reference circuit according to Embodiment 2.

FIG. 14 is a circuit diagram showing reference circuit 14a, which is an example of the configuration of reference circuit 14 in the switching power supply device according to Embodiment 2. FIG. 14 differs from FIG. 8 showing reference circuit 14 in Embodiment 1 in that where operational amplifier 40 and resistor 41 are connected at a different location and constant current source 401, NPN bipolar transistor 402, resistor 403, voltage subtraction circuit 404, and modulation amplitude adjustment circuit 405 are added.

In Embodiment 2, voltage subtraction circuit 404 generates differential voltage that is the result of subtraction of voltage signal V_IS from voltage signal V_EAO, and the differential voltage is input to the base of NPN bipolar transistor 402 and converted by the V-I converter into a current value. Constant current source 401 is connected to the collector of NPN bipolar transistor 402.

Since voltage signal V_IS is greater than voltage signal V_EAO in the PFM region, the output voltage from voltage subtraction circuit 404 is lower than or equal to zero, and NPN bipolar transistor 402 is therefore turned off. The current flowing through resistor 403 is therefore substantially zero, and the current from constant current source 401 is input with not change therein as current signal I_Ref2 to modulation amplitude adjustment circuit 405.

On the other hand, since voltage signal V_IS is smaller than voltage signal V_EAO in the PWM region, the higher voltage signal V_EAO, the higher the output voltage from voltage subtraction circuit 404. That is, in the PWM region, the greater the drain current peak, the greater the current flowing through resistor 403, and when the current flowing through resistor 403 is greater than the current from constant current source 401, current signal I_ref2 is zero.

Modulation amplitude adjustment circuit 405 generates current signal I_Jit2, which is current modulation signal I_Jitter having an amplitude that changes in proportion to current signal I_Ref2, and current signal I_Jit2 is superimposed on the output from resistor 41.

Modulation amplitude adjustment circuit 405 is formed, for example, of a multiplication/division circuit based on current modulation signal I_Jitter and current signal I_Ref2, and in a case where voltage signal V_EAO decreases and the current flowing through resistor 403 is zero, that is, in the case where the current from constant current source 401 directly forms current signal I_Ref2, modulation amplitude adjustment circuit 405 outputs a value equivalent to current modulation signal I_Jitter as current signal I_Jit2.

In a case where voltage signal V_EAO increases and the current flowing through resistor 403 increases, when the current flowing through resistor 403 is greater than the current from constant current source 401, current signal I_ref2 is zero, and current signal I_Jit2 is also zero.

The control described above allows turn-off timing modulation in which the amplitude gradually decreases in accordance with the output state signal after the PFM control is switched to the PWM control, as shown in FIG. 15.

As described above, the switching power supply device according to Embodiment 2 gradually reduces the amplitudes of the turn-on timing modulation and the turn-off timing modulation after the PFM control and the PWM control are switched from one to the other, whereby the operation of the switching power supply device at the boundary is likely to be stabilized.

Further, the point where the amplitudes of the turn-on timing modulation and the turn-off timing modulation start decreasing is the switching boundary between the PFM control and the PWM control and may instead be a point in the vicinity of the switching boundary.

Instead of continuously decreasing the modulation amplitudes, the modulation amplitudes may be decreased stepwise to zero after the switching boundary between the PFM control and the PWM control.

Embodiment 3

A switching power supply device and a semiconductor device according to Embodiment 3 will next be described with reference to FIGS. 16 and 17.

In Embodiments 1 and 2, the switching frequency turn-on timing modulation is configured so that the amount of modulation is gradually decreased from the switching boundary between the PWM control and the PFM control or in the vicinity of the boundary to substantially zero. In Embodiment 3, a switching power supply device that performs the turn-on timing modulation across the entire operation region of the PFM control will be described. No description that duplicates the descriptions in Embodiments 1 and 2 will be made.

Figure 16:
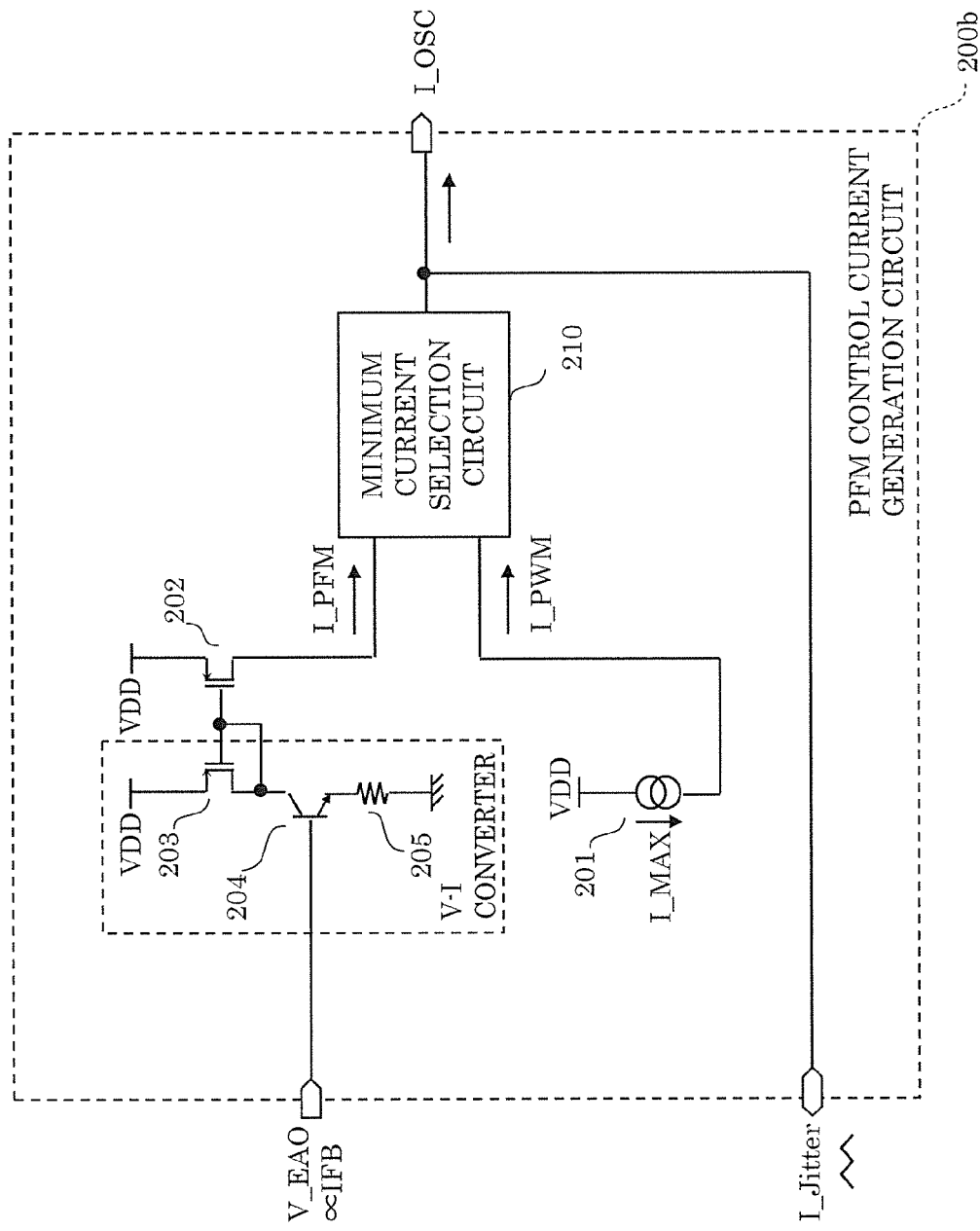
FIG. 16 is a circuit diagram showing a configuration of a PFM control current generation circuit according to Embodiment 3.

FIG. 16 is a circuit diagram showing PFM control current generation circuit 200b, which is an example of the configuration of PFM control current generation circuit 200 in PFM control circuit 13 in the switching power supply device according to Embodiment 3. FIG. 16 differs from FIG. 6 showing PFM control current generation circuit 200 in Embodiment 1 in terms of the location where current modulation signal I_Jitter is superimposed.

In Embodiment 3, current modulation signal I_Jitter is not superimposed on constant current source 201 but is superimposed on the output from minimum current selection circuit 210.

Figure 17:
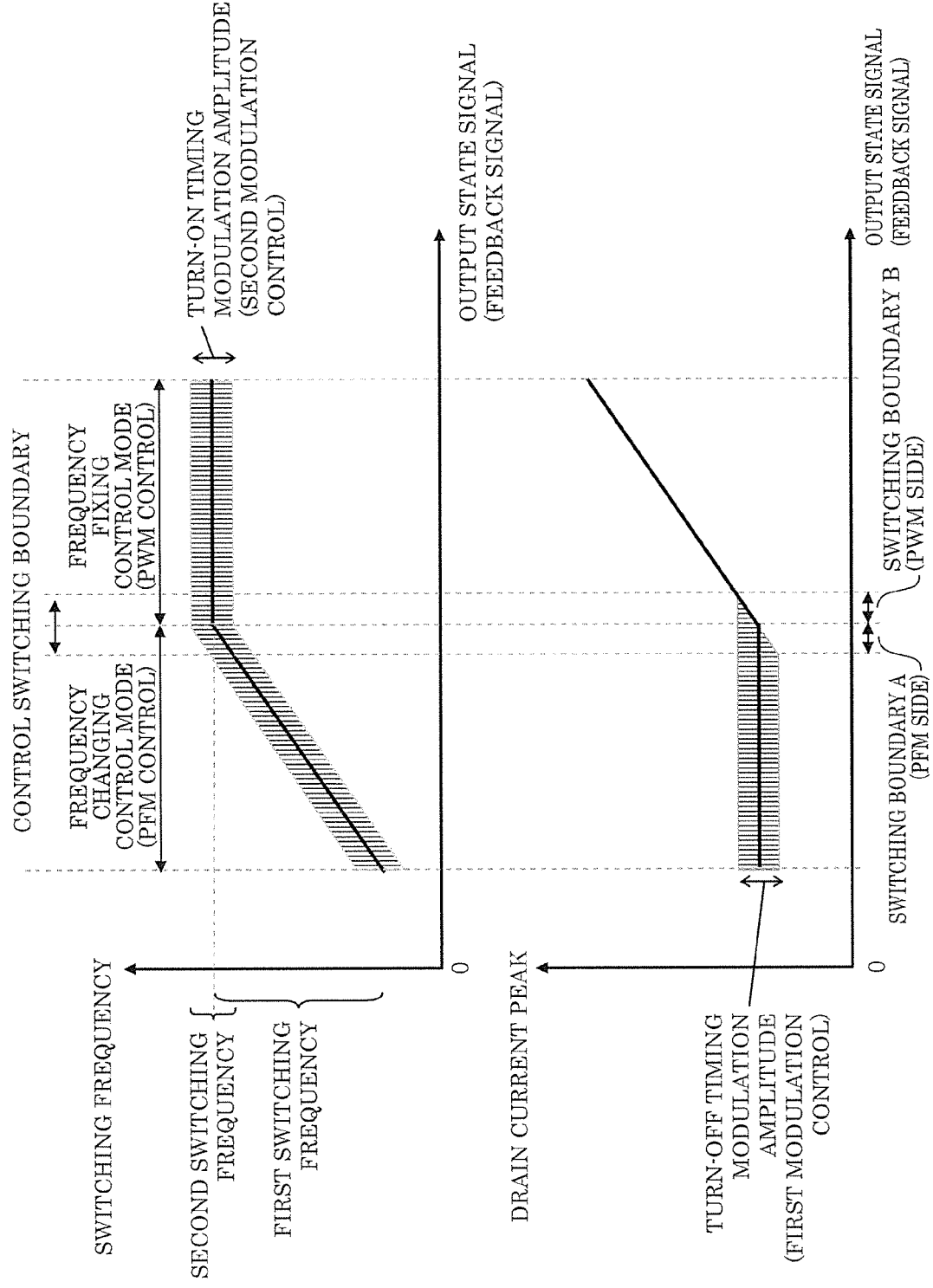
FIG. 17 shows an example of the relationship of the switching frequency and a peak value of drain current allowed to flow through a switching element versus an output state signal in a semiconductor device according to Embodiment 3.

The control described above allows the turn-on timing modulation to be performed on the switching frequency of oscillator 100 across the entire operation segment in the PFM control region, as shown in FIG. 17.

As described above, in the switching power supply device according to Embodiment 3, which does not switch the turn-on timing modulation at the boundary between the PFM control and the PWM control, the operation of the switching power supply device at the boundary is likely to be stabilized.

Further, the frequency modulation in the PFM region provides a higher switching frequency modulation effect when the turn-on timing modulation and the turn-off timing modulation are combined with each other than when only the turn-off timing modulation is performed. In other words, to provide the same modulation effect as that in Embodiment 1, the turn-off timing modulation amplitude can be set at a smaller value in Embodiment 3 than in Embodiment 1, whereby the stability of the control of the switching power supply can be increased.

In the turn-off modulation control at the boundary between the PFM control and the PWM control, reference circuit 14 described in Embodiment 1 is used, and reference circuit 14a described in Embodiment 2 may be used.

Embodiment 4

A switching power supply device and a semiconductor device according to Embodiment 4 will next be described with reference to FIGS. 18, 19, and 20.

In Embodiment 1, the switching frequency turn-on timing modulation is configured so that the amount of modulation is gradually decreased from the switching boundary between the PWM control and the PFM control or in the vicinity of the boundary to substantially zero. Embodiment 4 will be described with reference to a switching power supply device in which the turn-on timing modulation is performed on the switching frequency of oscillator 100 across the entire operation region in the PFM control and the turn-on timing modulation amplitude changes in accordance with the switching frequency in the PFM control. No description that duplicates the description in Embodiment 1 will be made.

Figure 18:
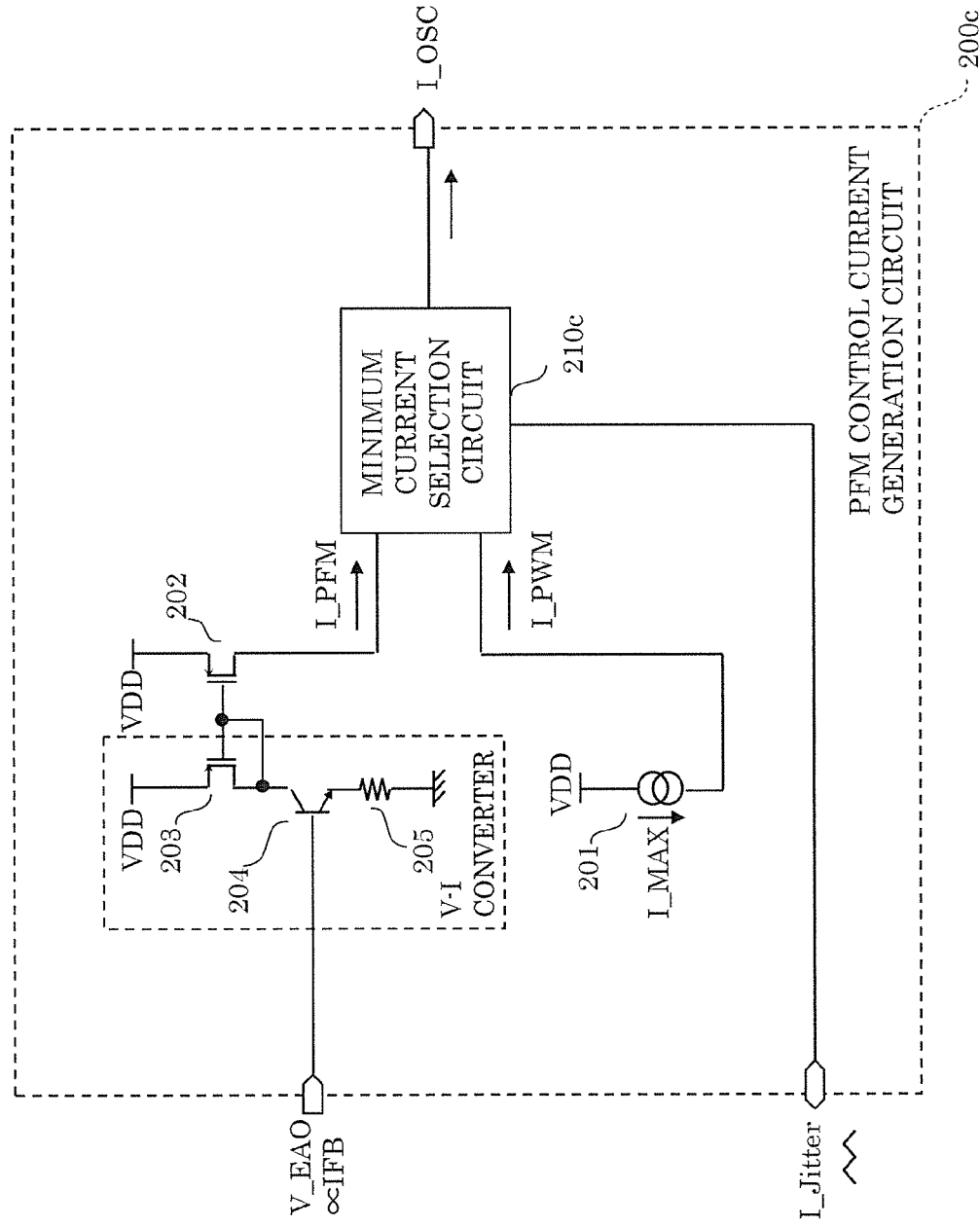
FIG. 18 is a circuit diagram showing a configuration of a PFM control current generation circuit according to Embodiment 4.

FIG. 18 is a circuit diagram showing PFM control current generation circuit 200c, which is an example of the configuration of PFM control current generation circuit 200 in PFM control circuit 13 in the switching power supply device according to Embodiment 4. FIG. 18 differs from FIG. 6 showing PFM control current generation circuit 200 in Embodiment 1 in terms of the location where current modulation signal I_Jitter is superimposed. In Embodiment 4, current modulation signal I_Jitter is not superimposed on constant current source 201 but is input to minimum current selection circuit 210c.

Figure 19:
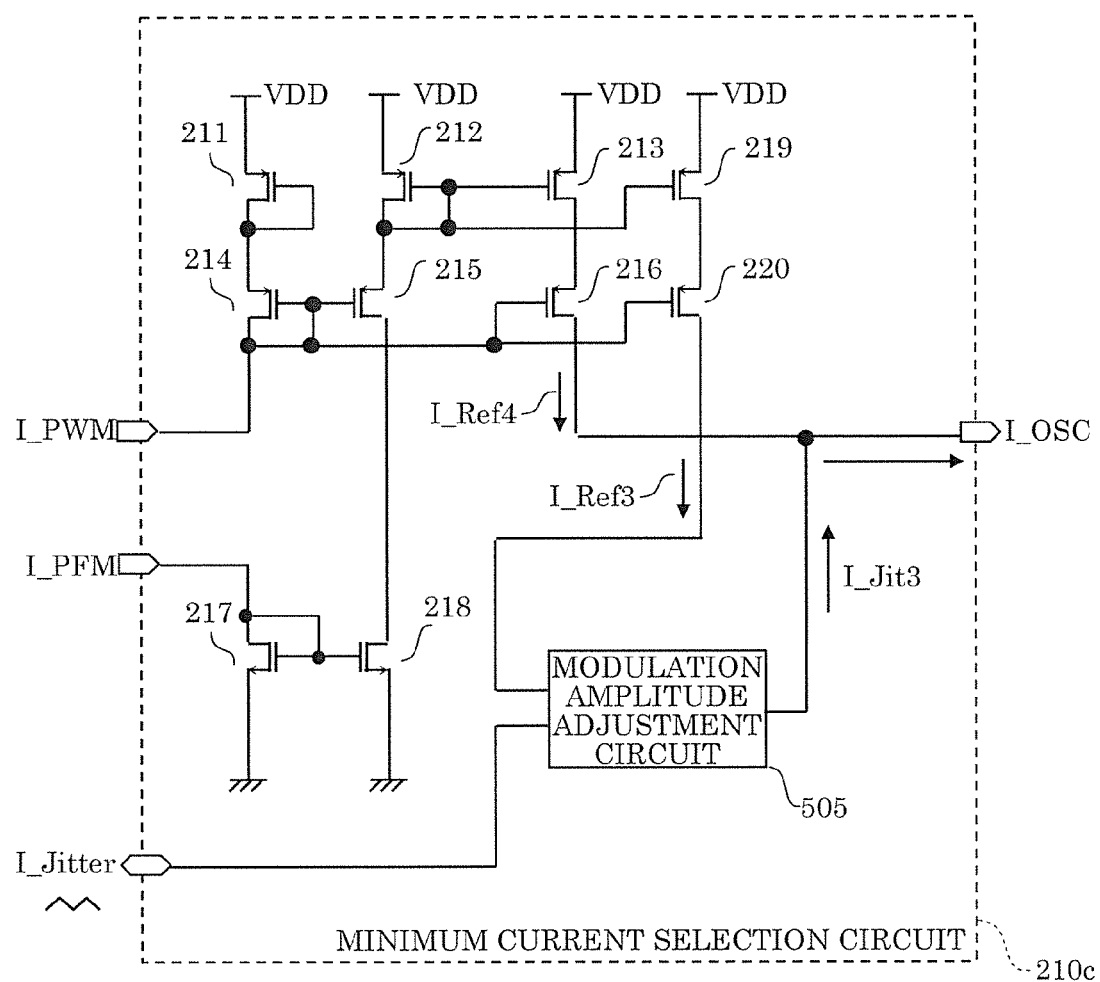
FIG. 19 is a circuit diagram showing a configuration of a minimum current selection circuit according to Embodiment 4.

FIG. 19 is a circuit diagram showing minimum current selection circuit 210c, which is an example of the configuration of minimum current selection circuit 210 in the switching power supply device according to Embodiment 4. FIG. 19 showing minimum current selection circuit 210c differs from FIG. 7 showing minimum current selection circuit 210 in Embodiment 1 in that P-type MOSFETs 219 and 220, modulation amplitude adjustment circuit 505, and current modulation signal I_Jitter are added.

Minimum current selection circuit 210c generates current signal I_Ref3 proportional to current signal I_Ref4 flowing via P-type MOSFET 216 and inputs current signal I_Ref3 to modulation amplitude adjustment circuit 505.

Modulation amplitude adjustment circuit 505 generates current signal I_Jit3, which is current modulation signal I_Jitter that changes in proportional to current signal I_Ref3 and superimposes current signal I_Jit3 on the output current signal I_OSC. Current signal I_Jit3 is so controlled that the modulation amplitude changes in accordance with the switching frequency, unlike current modulation signal I_Jitter. The sum of current signal I_ref4 and current signal I_Jit3 is therefore output as current signal I_OSC.

Figure 20:
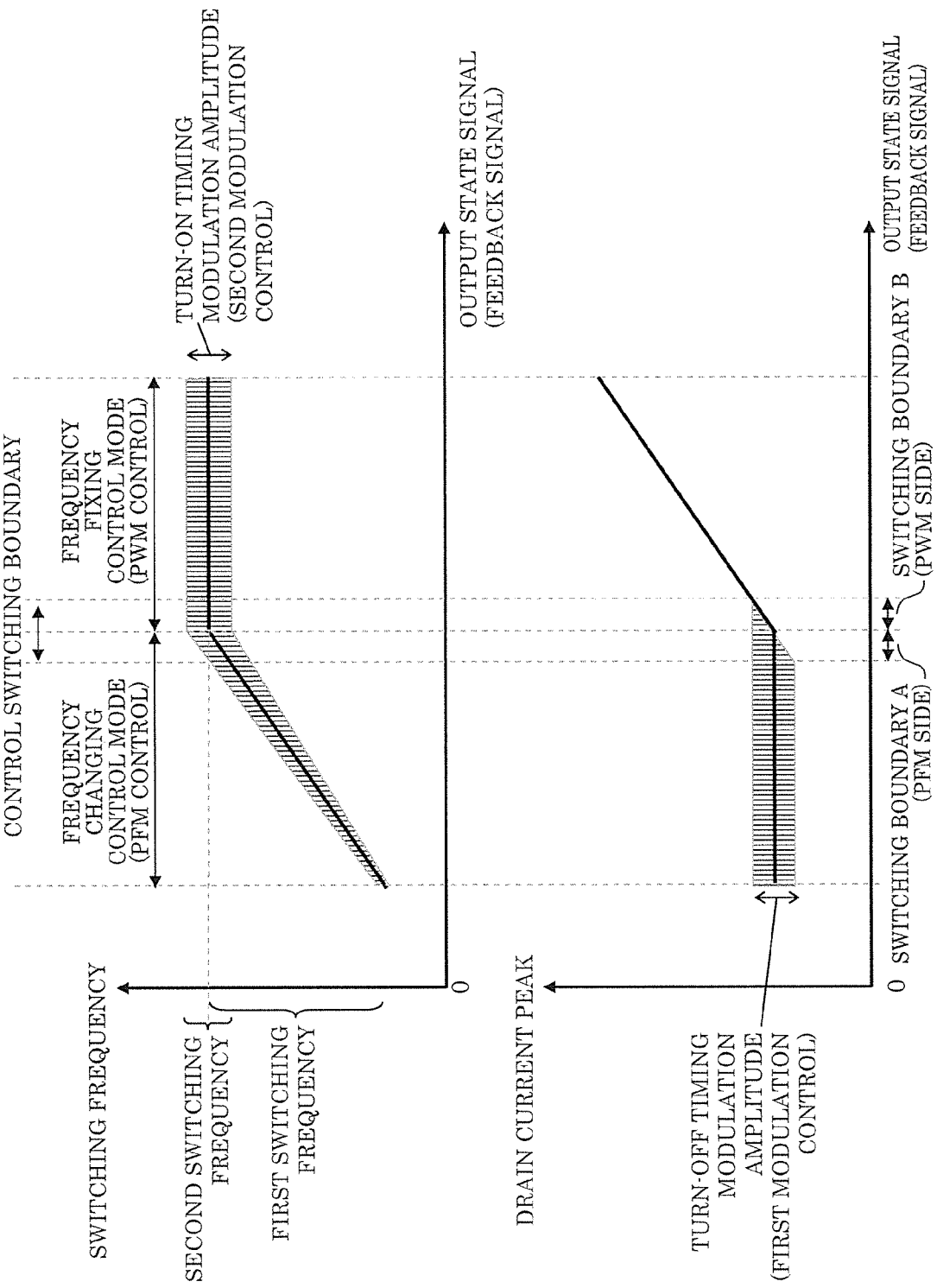
FIG. 20 shows an example of the relationship of the switching frequency and a peak value of drain current allowed to flow through a switching element versus an output state signal in a semiconductor device according to Embodiment 4.

The control described above allows the turn-on timing modulation to be performed on the switching frequency across the entire operation region in the PFM control and the turn-on timing modulation amplitude to change in accordance with the switching frequency in the PFM control, as shown in FIG. 20.

As described above, in the switching power supply device according to Embodiment 4, which does not switch the turn-on timing modulation at the boundary between the PFM control and the PWM control, the operation of the switching power supply device at the boundary is likely to be stabilized, as in Embodiment 3.

Further, the frequency modulation in the PFM region provides a higher switching frequency modulation effect when the turn-on timing modulation and the turn-off timing modulation are combined with each other than when only the turn-off timing modulation is performed. In other words, to provide the same modulation effect as that in Embodiment 1, the turn-off timing modulation amplitude can be set at a smaller value in Embodiment 4 than in Embodiment 1, whereby the stability of the control of the switching power supply can be increased.

Further, in Embodiment 4, the turn-on timing modulation amplitude is changed in accordance with the switching frequency, so that the combination of the effect provided by the turn-on timing modulation and the effect provided by the turn-on timing modulation resulting from a change in the modulation amplitude is provided when the output state signal changes, whereby a higher modulation effect is achieved as compared with Embodiments 1 and 2.

In Embodiment 4, the turn-on timing modulation amplitude is changed in accordance with the switching frequency and may instead be changed in accordance with the drain current peak.

Embodiment 5

A switching power supply device and a semiconductor device according to Embodiment 5 will next be described with reference to FIGS. 21 and 22.

In Embodiment 1, the turn-off timing in the PFM control region does not change depending on the output state signal but is determined by voltage signal V_Jitter, which is the superimposition of periodic current modulation signal I_Jitter on voltage signal V_IS.

Embodiment 5 will be described with reference to a switching power supply device in which the turn-off timing changes in accordance not only with the periodic modulation but with the output state signal. No description that duplicates the description in Embodiment 1 will be made.

Figure 21:
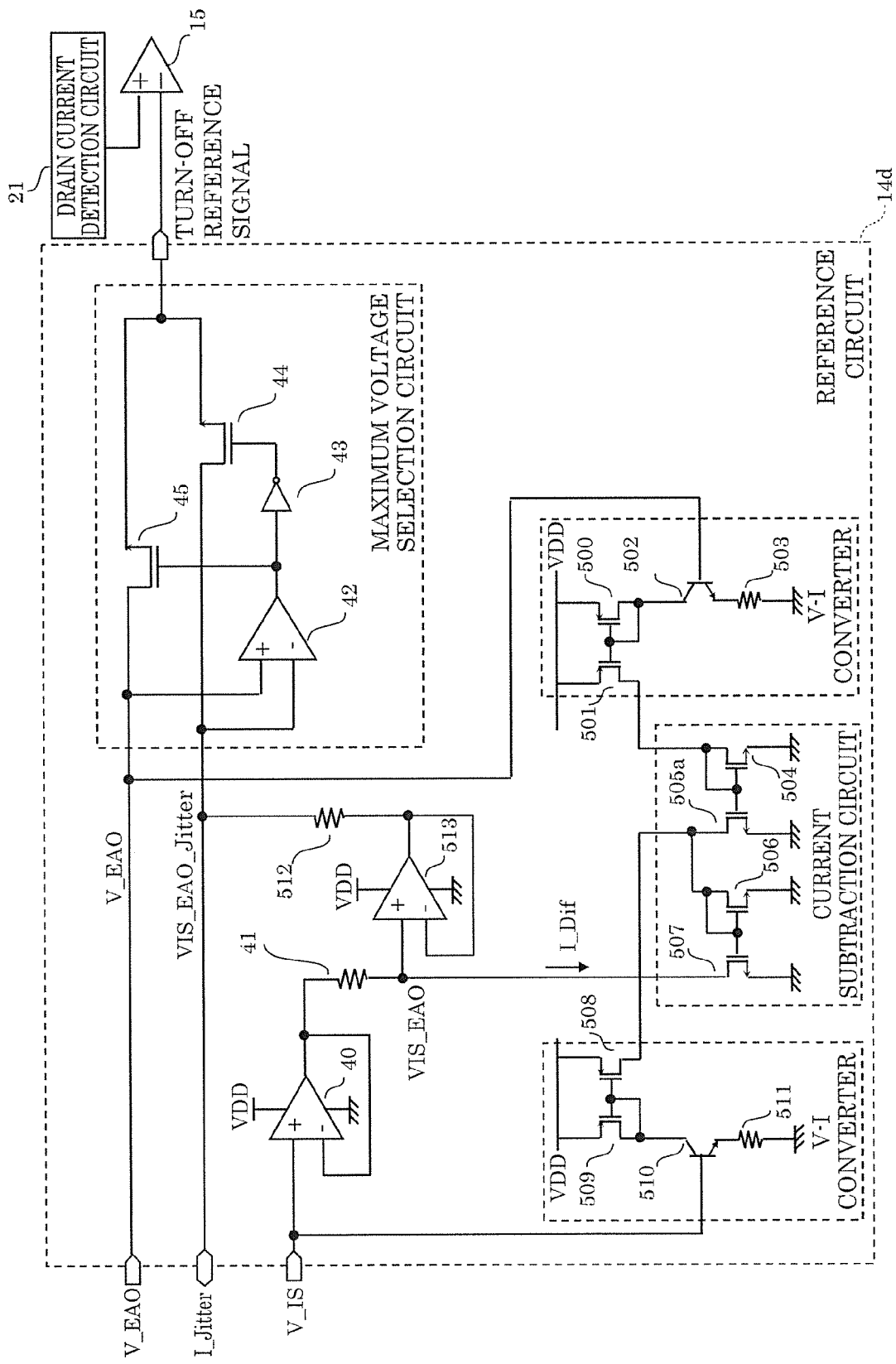
FIG. 21 is a circuit diagram showing a configuration of a reference circuit according to Embodiment 5.
Figure 22:
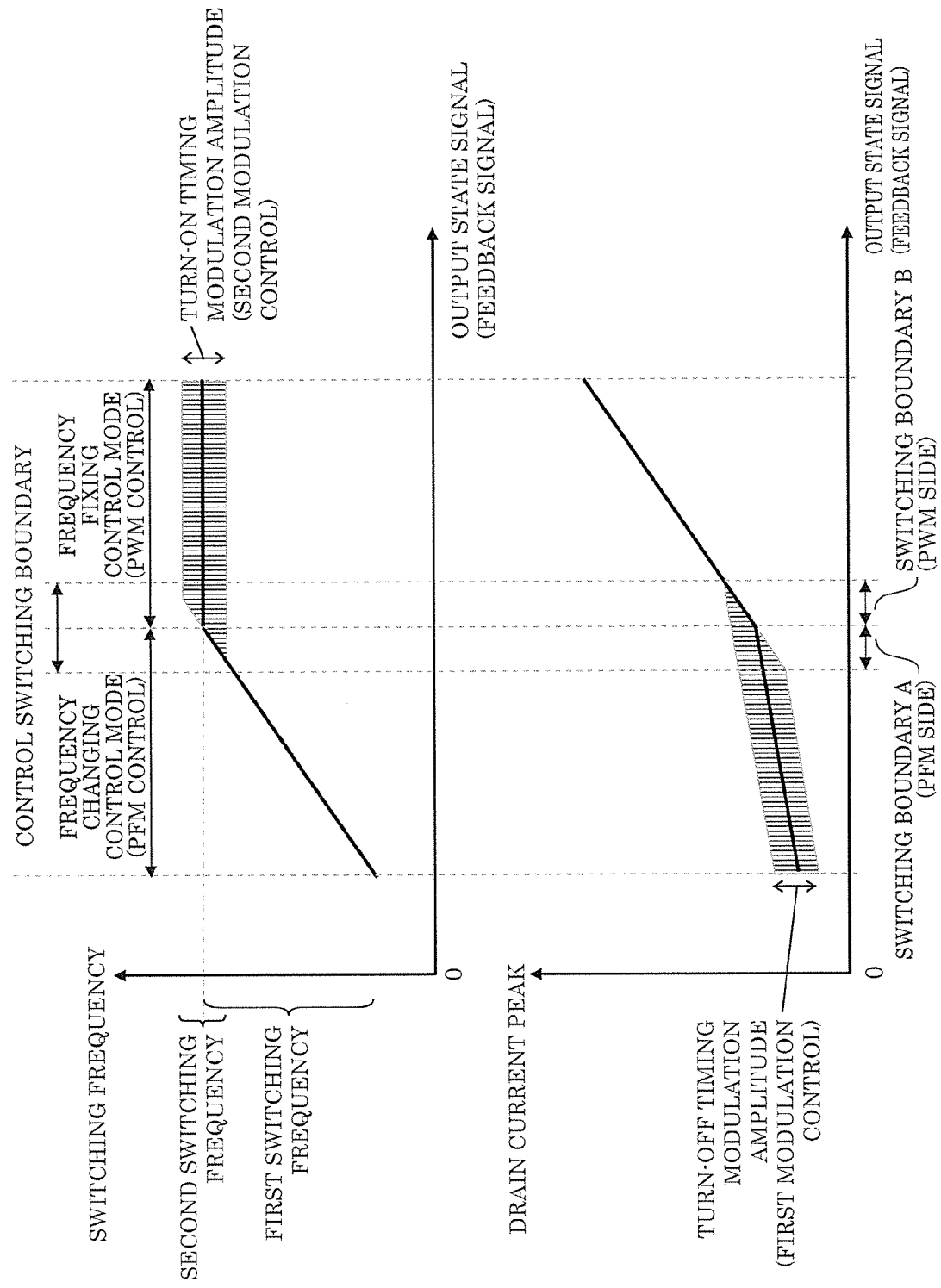
FIG. 22 shows an example of the relationship of the switching frequency and a peak value of drain current allowed to flow through a switching element versus an output state signal in a semiconductor device according to Embodiment 5.

FIG. 21 is a circuit diagram showing reference circuit 14d, which is an example of the configuration of reference circuit 14 in the switching power supply device according to Embodiment 5. FIG. 21 differs from FIG. 8 showing reference circuit 14 in Embodiment 1 in that P-type MOSFETs 500, 501, 508, and 509, NPN bipolar transistors 502 and 510, resistors 503, 511, and 512, N-type MOSFETs 504, 505a, 506, and 507, and operational amplifier 513 are added. FIG. 21 further differs from FIG. 8 in terms of means for generating signal V_Jitter input to the negative (−) input terminal of comparator 42.

The pairs of P-type MOSFETs 500 and 501, P-type MOSFETs 508 and 509, N-type MOSFETs 504 and 505a, and N-type MOSFETs 506 and 507 each form a mirror circuit, for example, having the mirror ratio of 1.

P-type MOSFETs 500 and 501, NPN bipolar transistor 502, and resistor 503 form a V-I converter, and P-type MOSFETs 508 and 509, NPN bipolar transistor 510, and resistor 511 form a V-I converter.

Further, N-type MOSFETs 504, 505a, 506, and 507 form a current subtraction circuit.

The current subtraction circuit generates a current value that is the result of subtraction of a current signal proportional to voltage signal V_EAO from a current signal proportional to voltage signal V_IS.

Since voltage signal V_IS is greater than voltage signal V_EAO in the PFM control region, the smaller voltage signal V_EAO, the greater the output current from the current subtraction circuit, that is, current I_Dif flowing through N-type MOSFET 507.

Therefore, voltage signal V_IS is converted by operational amplifier 40 in terms of impedance and input as voltage signal VIS_EAO, which is the difference between the voltage produced when I_Dif, which changes in accordance with the feedback, flows through resistor 41, and the voltage carried by voltage signal V_IS, to the positive (+) voltage input terminal of operational amplifier 513. Further, voltage signal VIS_EAO is converted by operational amplifier 513 in terms of impedance and input as voltage signal VIS_EAO Jitter, which is the sum of the voltage produced when current modulation signal I_Jitter flows as current through resistor 512 and voltage signal VIS_EAO, to the negative (−) voltage input terminal of comparator 42 and the drain of N-type MOSFET 44.

The control described above allows the turn-off timing in the PFM region not only to be periodically modulated but to be so controlled that the drain current peak decreases as the switching frequency lowers.

As described above, the switching power supply device according to Embodiment 5 can increase the response speed against a change in the load in the PFM control region by changing the turn-off timing in the PFM control in accordance with the switching frequency.

In the turn-off modulation control at the boundary between the PFM control and the PWM control, reference circuit 14 described in Embodiment 1 is used, and reference circuit 14a described in Embodiment 2 may be used. As described above, to exemplify the technology disclosed in the present application, the accompanying drawings and the detailed descriptions have been provided in the form of Embodiments 1 to 5.

The components described in the accompanying drawings and the detailed descriptions may therefore include not only essential components for achievement of the object but components that are not essential to achieve the object. Therefore, the description of the non-essential components in the accompanying drawings and the detailed descriptions should not lead to conclusion that the non-essential components are essential.

The technology in the present disclosure is not limited thereto and is also applicable to embodiments in which changes, replacements, additions, omissions, and other modifications are made as appropriate on the present disclosure. Further, a variety of variations that a person skilled in the art conceive of and forms configured by a combination of the components in the plurality of the embodiments also fall within the technical scope of the present disclosure as long as the variations or forms do not depart from the technical substance of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The switching power supply devices and the semiconductor devices according to the present disclosure perform both the turn-on timing modulation and the turn-off timing modulation in frequency changing control. Performing the turn-off timing modulation in the PFM control region and the turn-on timing modulation in the PWM control region allows the frequency jitter control across the entire operation region from the PFM control to the PWM control, whereby the resultant effective frequency dispersion allows reduction in conducted EMI. Further, even after the PFM control and the PWM control are switched from one to the other, a stable operation of the switching power supply device can be achieved at the boundary between the PFM control and the PWM control by continuously performing at least one of the modulations in the vicinity of the switching boundary.

The switching power supply device and semiconductor device according to the present disclosure can be used in a switching power supply device such as an AC-DC converter or a DC-DC converter built in a variety of electronic apparatuses or an AC adaptor external thereto.

What is claimed is:

1. A switching power supply device, comprising:
   an energy conversion circuit to which an input voltage is input, the input voltage being a direct current input voltage;
   an output rectifying and smoothening circuit that rectifies and smoothens a voltage output from the energy conversion circuit to output an output voltage to a load;
   a switching element that is connected to the energy conversion circuit and switches the input voltage;
   a switching control circuit that controls a switching operation of the switching element; and
   an output state detection circuit that generates an output state signal indicating a state of the load, the state determining electric power output from the energy conversion circuit,
   wherein the switching control circuit:
      switches two control modes from one to another in accordance with the output state signal, the two control modes including: (i) a frequency changing control mode in which a turn-on timing at which the switching element is turned on is controlled in accordance with a change of the output state signal to change a first switching frequency that is a switching frequency of the switching element; and (ii) a frequency fixing control mode in which a turn-off timing at which the switching element is turned off is controlled in accordance with the change of the output state signal and the switching frequency of the switching element is set to a second switching frequency that is constant regardless of the change of the output state signal; and
      performs, in the frequency changing control mode, first modulation control in which the turn-off timing at which the switching element is turned off is modulated by a first modulation signal so that the first switching frequency is modulated;

performs, in the frequency fixing control mode, second modulation control in which the second switching frequency is modulated by a second modulation signal; and performs at least one of the following:
when switching the frequency changing control mode to the frequency fixing control mode, continuing the first modulation control even after the frequency changing control mode is switched to the frequency fixing control mode, the first modulation control being performed in the frequency changing mode; and
when switching the frequency fixing control mode to the frequency changing control mode, continuing the second modulation control even after the frequency fixing control mode is switched to the frequency changing control mode, the second modulation control being performed in the frequency fixing control mode, wherein the switching control circuit includes an oscillator for which the first switching frequency and the second switching frequency are set.

2. The switching power supply device according to claim 1,
wherein the switching control circuit performs at least one of the following:
when switching the frequency changing control mode to the frequency fixing control mode, gradually decreasing a modulation amplitude in the first modulation control until the frequency changing control mode is switched to the frequency fixing control mode; and
when switching the frequency fixing control mode to the frequency changing control mode, gradually decreasing a modulation amplitude in the second modulation control until the frequency fixing control mode is switched to the frequency changing control mode.

3. The switching power supply device according to claim 1,
wherein the switching control circuit:
compares the turn-on timing at which the switching element is turned on and which has been modulated in accordance with the second modulation signal with a turn-on timing set in the frequency changing control mode; and
turns on the switching element at a later turn-on timing of the turn-on timings.

4. The switching power supply device according to claim 1,
wherein the switching control circuit:
compares the turn-off timing at which the switching element is turned off and which has been modulated in accordance with the first modulation signal with a turn-off timing set in the frequency fixing control mode; and
turns off the switching element at a later turn-off timing of the turn-off timings.

5. The switching power supply device according to claim 1,
wherein the switching control circuit performs at least one of the following:
when switching the frequency changing control mode to the frequency fixing control mode, gradually decreasing a modulation amplitude in the first modulation control after the frequency changing control mode is switched to the frequency fixing control mode; and
when switching the frequency fixing control mode to the frequency changing control mode, gradually decreasing a modulation amplitude in the second modulation control after the frequency fixing control mode is switched to the frequency changing control mode.

6. The switching power supply device according to claim 1,
wherein the switching control circuit modulates the first switching frequency by the second modulation signal across an entire segment in which the switching power supply device operates in the frequency changing control mode.

7. The switching power supply device according to claim 6,
wherein in the control which is performed in the frequency changing control mode and in which the first switching frequency is modulated by the second modulation signal, a modulation amplitude is set to a larger value for a higher switching frequency of the switching element.

8. The switching power supply device according to claim 1,
wherein the switching control circuit controls the turn-off timing at which the switching element is turned off in the frequency changing control mode to be constant irrespective of the output state signal.

9. The switching power supply device according to claim 1,
wherein the switching control circuit changes, in accordance with the output state signal, the turn-off timing at which the switching element is turned off in the frequency changing control mode.

10. The switching power supply device according to claim 9,
wherein the switching control circuit delays the turn-off timing at which the switching element is turned off in the frequency changing control mode as the first switching frequency becomes higher.

11. A semiconductor device for switching control, the semiconductor device comprising:
a semiconductor substrate; and
the switching control circuit in the switching power supply device according to claim 1 disposed as an integrated circuit on the semiconductor substrate.

* * * * *